(12) United States Patent
Edwards et al.

(10) Patent No.: US 7,500,230 B2
(45) Date of Patent: Mar. 3, 2009

(54) RAISING NATIVE SOFTWARE CODE

(75) Inventors: Andrew James Edwards, Bellevue, WA (US); Ronnie I. Chaiken, Woodinville, WA (US); Dzmitry Suponau, Bellevue, WA (US); S. Craig Schertz, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 11/090,678

(22) Filed: Mar. 25, 2005

(65) Prior Publication Data

US 2006/0218540 A1  Sep. 28, 2006

(51) Int. Cl.
*G06F 9/45* (2006.01)

(52) U.S. Cl. .................. 717/141; 717/136; 717/140; 717/154; 717/155

(58) Field of Classification Search .......... 717/136–155
See application file for complete search history.

(56) References Cited

U.S. PATENT DOCUMENTS

| | | | |
|---|---|---|---|
| 5,301,325 A * | 4/1994 | Benson ........................ | 717/159 |
| 6,460,178 B1 | 10/2002 | Chan et al. | |
| 6,481,008 B1 | 11/2002 | Chaiken et al. | |
| 6,505,344 B1 * | 1/2003 | Blais et al. .................. | 717/151 |
| 6,662,356 B1 | 12/2003 | Edwards et al. | |
| 6,802,056 B1 | 10/2004 | Chaiken et al. | |
| 6,834,383 B2 | 12/2004 | Gillies et al. | |
| 6,857,120 B1 * | 2/2005 | Arnold et al. ................ | 717/157 |
| 6,993,754 B2 * | 1/2006 | Freudenberger et al. .... | 717/153 |
| 7,127,710 B2 * | 10/2006 | Ghiya et al. ................ | 717/151 |
| 2002/0083425 A1 | 6/2002 | Gillies et al. | |
| 2003/0093780 A1 * | 5/2003 | Freudenberger et al. .... | 717/153 |
| 2003/0101335 A1 | 5/2003 | Gillies et al. | |
| 2003/0101380 A1 | 5/2003 | Chaiken et al. | |
| 2003/0217196 A1 | 11/2003 | Chan et al. | |
| 2003/0217197 A1 | 11/2003 | Chan et al. | |
| 2003/0237077 A1 * | 12/2003 | Ghiya et al. ................ | 717/151 |
| 2004/0205740 A1 * | 10/2004 | Lavery et al. ............... | 717/151 |
| 2004/0264367 A1 | 12/2004 | Edwards | |
| 2004/0268309 A1 | 12/2004 | Grover et al. | |
| 2005/0010891 A1 | 1/2005 | Chaiken et al. | |

OTHER PUBLICATIONS

"3.5 Control Transfer Instructions," http://my.tele2.ee/mtx/i386/chp03-05.htm, 4 pages, Feb. 4, 2005.

(Continued)

*Primary Examiner*—Wei Y Zhen
*Assistant Examiner*—Matthew J Brophy
(74) *Attorney, Agent, or Firm*—Klarquist Sparkman, LLP

(57) ABSTRACT

Ambiguous stack references in low level software instructions can be resolved when raising a representation of low level software instructions, such as native code. The number of parameters passed to a function can be determined by heuristics, including direct call and indirect call heuristics. Indirect call heuristics can include dataflow-to-target-function, dataflow-to-target-type, import name, and cleanup instructions heuristics. A control flow heuristic can use an alternating direction propagation of seed points to determine the stack height at basic block boundaries. Interpolation can be used within the basic blocks as needed. The raised representation can be used for static analysis of the low level software instructions.

20 Claims, 29 Drawing Sheets

OTHER PUBLICATIONS

"/Gd, /Gr, /Gz (Calling Convention)(Visual C++ Programmer's Guide)," http://msdn.microsoft.com/library/default.asp?url=/library/en-us/vccore98/HTML/_core_.2f.gd.2c_2f.gr.2c_2f.gz.asp, 2 pages, Feb. 15, 2005.

"alloca()—allocate space in the stack frame," http://www.mkssoftware.com/docs/man3/alloca.3.asp, 1 page, Feb. 4, 2005.

"CS360 Lecture notes—Assembler Lecture #1," http://www.cs.utk.edu/~plank/plank/classes/cs360/360/notes/Assembler1/lecture.html, 11 pages, Feb. 4, 2005.

"Decorated Names(Visual C++ Programmer's Guide)," http://msdn.microsoft.com/library/default.asp?url=/library/en-us/vccore98/HTML/_core_decorated_names.asp, 1 page, Feb. 15, 2005.

"Microsoft Calling Conventions," http://www.cs.cornell.edu/courses/cs412/2001sp/resources/microsoft-calling-conventions.html, 4 pages, Feb. 15, 2005.

"Using a Listing to View Decorated Names(Visual C++ Programmer's Guide)," http://msdn.microsoft.com/library/default.asp?url=/library/en-us/vccore98/html/_core_using_a_listing_to_view_decorated_names.asp, 1 page, Feb. 15, 2005.

"Using Decorated Names(Visual C++ Programmer's Guide)," http://msdn.microsoft.com/library/default.asp?url= /library/en-us/vccore98/HTML/_core_using_decorated_names.asp, 1 page, Feb. 15, 2005.

"Using DUMPBIN to View Decorated Names(Visual C++ Programmer's Guide)," http://msdn.microsoft.com/library/default.asp?url=/library/en-us/vccore98/html/_core_using_dumpbin_to_view_decorated_names.asp, 1 page, Feb. 15, 2005.

"Viewing Decorated Names(Visual C++ Programmer's Guide)," http://msdn.microsoft.com/library/default.asp?url=/library/en-us/vccore98/HTML/_core_viewing_decorated_names.asp, 1 page, Feb. 15, 2005.

Friedl, "Intel x86 Function-call Conventions—Assembly View," http://www.unixwiz.net/techtips/win32-callconv-asm.html, 6 pages, Feb. 4, 2005.

Jönsson, "Calling conventions on the x86 platform," http://www.angelcode.com/dev/callconv/callconv.html, 4 pages, Feb. 15, 2005.

Tutorial for Euphoria programmers, http://www.eberlein.org/euphoria/easyasm.html, 3 pages, Jan. 25, 2005.

"Porting VAX MACRO Code to Open VMS Alpha," Digital Equipment Corporation, Index, Preface, and Chapters 1-4, updated 1998, 96 pages.

* cited by examiner

PRIOR ART

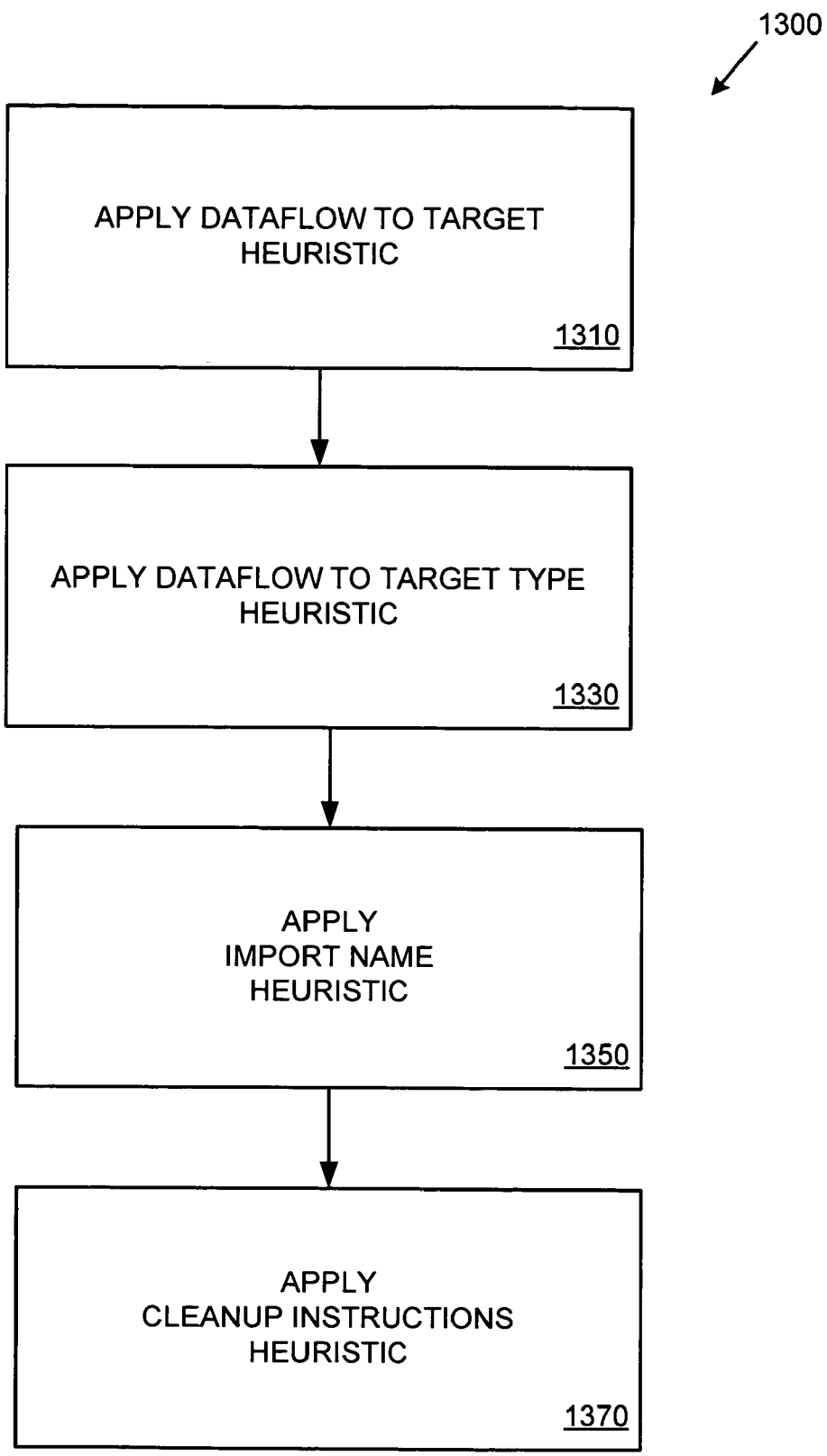

FIG. 15A

```
FOO * FOOMAKER();
VIRTUAL BAR();
MAIN
{
  FOO * P = FOOMAKER();
  P->BAR();
}
```
1510

FIG. 15B

```
EAX = CALL FOOMAKER();
MOV ECX, EAX
MOV EAX, [ECX]
CALL [EAX + 8]
```
1520

FIND *THIS* POINTER VIA DATAFLOW
1560

↓

FIND FUNCTION VIA *THIS* POINTER AND OFFSET
1570

↓

DETERMINE BEHAVIOR ACCORDING TO DIRECT CALL HEURISTIC
1580

SOFTWARE 2980 FOR TECHNOLOGY
DESCRIBED IN EXAMPLE(S)

RAISING NATIVE SOFTWARE CODE

TECHNICAL FIELD

The technical field relates to analysis of software, such as static analysis for determining program correctness or other software behavior.

BACKGROUND

Various tools and techniques have been used to analyze software. One popular method is to convert source code into an intermediate representation ("IR") that can be analyzed by various tools to find errors in the program or analyze its structure and projected behavior. Because such an analysis does not involve executing the software, it is sometimes called "static analysis" of software.

Static analysis can be used for a variety of purposes, including data flow analyses, assertion checking, and the like. Typically, the source code is transformed into an intermediate representation before the analysis begins. The IR does not have source-specific conventions and facilitates various techniques used during static analysis.

However, there are times when the source code for software and the intermediate representation are unavailable; only a low level form is available. In such a case, it is not possible to obtain the intermediate representation. There thus exists a need to somehow provide for static analysis for lower levels of code, such as native software instructions.

SUMMARY

Ambiguous references to a stack can be disambiguized. For example, calls to functions can be analyzed to determine their stack-height-altering behavior (e.g., the number of parameters passed to the function).

Such techniques can be applied to raise low level code to a higher level (e.g., intermediate) representation compatible with various static analysis tools, such as those used on compiler-related intermediate representations. Ambiguous references to the stack can be disambiguized by using a variety of heuristics that can determine the stack-height-altering behavior of calls to functions.

Heuristics related to direct and indirect calls can be used. Control flow heuristics can be applied to functions for which the other heuristics have failed.

Unambiguous stack references can indicate a relative stack location suitable for use in an intermediate representation. Labels can be used for the relative stack locations if desired.

The foregoing and other features and advantages will become more apparent from the following detailed description of disclosed embodiments, which proceeds with reference to the accompanying drawings.

BRIEF DESCRIPTION OF THE FIGURES

FIG. 13 is a flowchart showing an exemplary method of applying a variety of indirect call heuristics.

FIG. 15A is block diagram showing an exemplary indirect call involving a virtual function at the source code level.

FIG. 15B is a block diagram showing an exemplary indirect call involving a virtual function at low level.

FIG. 15C is a flowchart showing an exemplary method for determining the stack-height-altering behavior of an indirect call involving a call to a virtual function, such as that shown in FIG. 15A.

DETAILED DESCRIPTION

EXAMPLE 1

Exemplary Ambiguities Due to Stack-Altering Behavior

Figure 1A:
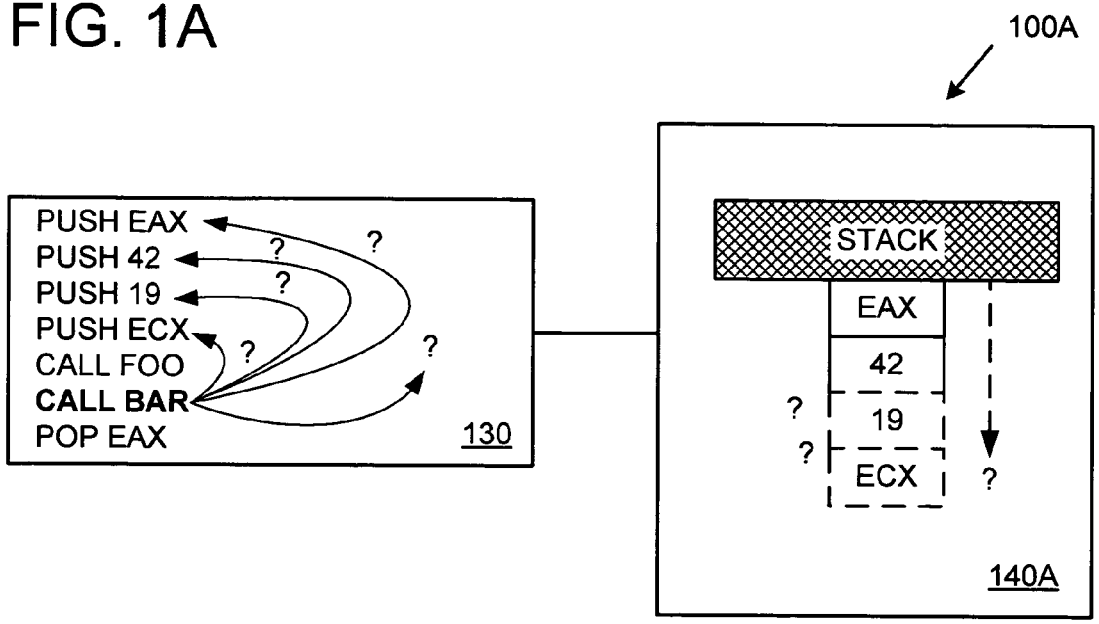
FIG. 1 is a block diagram showing ambiguous stack references in program instructions.
Figure 1B:
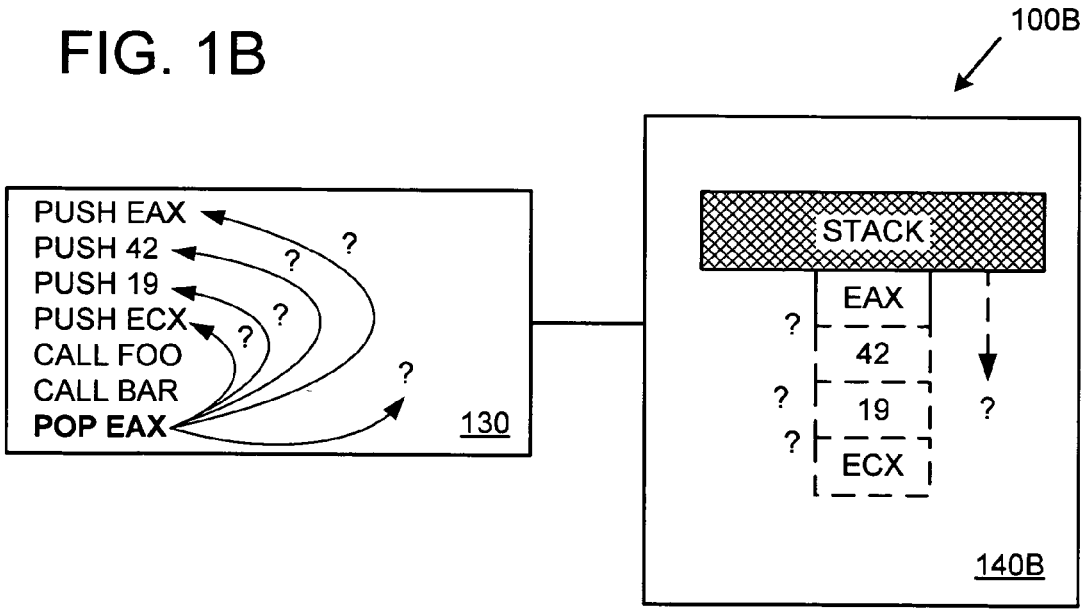

FIG. 1 shows various types of ambiguities that can arise when trying to determine what values reside on the stack. In the example, eax, 42, 19, and ecx are pushed onto the stack. Subsequently, calls are made to functions foo and bar. However, it is not known whether and how many arguments are passed to (e.g., consumed by) foo via the stack. In other words, foo's stack-height-altering behavior is unknown. Further, the call to bar suffers the same ambiguity, compounded by the uncertainty of foo's stack-altering behavior.

After bar returns, the value of eax is popped off the stack. However, because the stack-altering behavior of foo and bar are unknown, it cannot be determined which value is popped for eax. The final value for eax could be the original value for eax shown in the first line of the example, 42, 19, ecx, or even some other value.

EXAMPLE 2

Exemplary Difficulties Due to Ambiguities

In the example described with reference to FIG. 1, above, it cannot be unambiguously determined which or how many values are passed to the function calls foo and bar. As a result, it is not possible to perform various static analysis techniques. Therefore, an opportunity to analyze the code is lost.

EXAMPLE 3

Exemplary Disambiguizer

Figure 2:
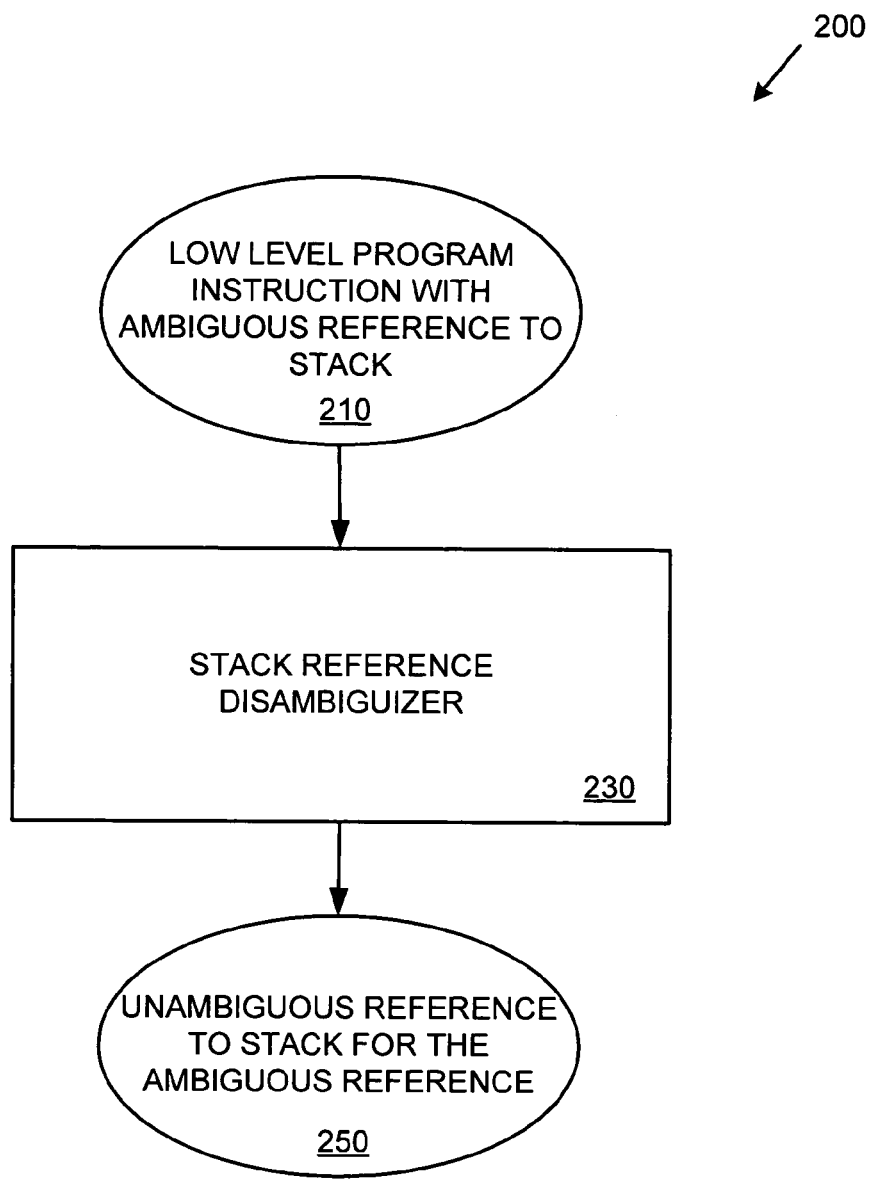
FIG. 2 is a block diagram showing an exemplary stack reference disambiguizer.

FIG. 2 shows an exemplary stack reference disambiguization system 200. In the example, a stack reference disambiguizer 230 receives a representation of one or more low level program instructions 210 with one or more ambiguous references to the stack.

The stack reference disambiguizer 230 then outputs at least one unambiguous reference to the stack 250 for the one or more ambiguous references to the stack.

EXAMPLE 4

Exemplary Method

Figure 3:
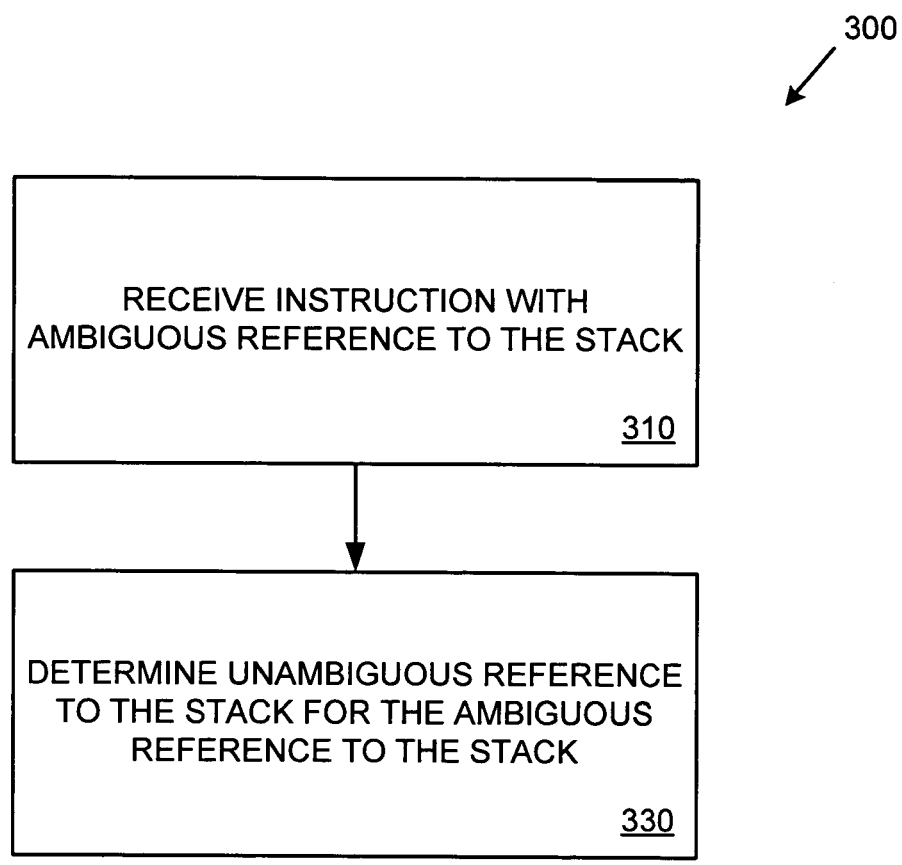
FIG. 3 is a flowchart illustrating an exemplary method for disambiguizing an ambiguous reference to the stack.

FIG. 3 shows an exemplary method for 300 disambiguizing one or more ambiguous references to the stack. Such a method can be employed by the stack disambiguizer 230 of FIG. 2. At 310, a representation of one or more low level instructions with one or more ambiguous references to a stack are received. At 330, at least one unambiguous reference to the stack for the one or more ambiguous references to the stack is determined. The unambiguous references can be stored or otherwise used with the instructions.

Any of the techniques described in any of the examples herein can be used to determine an unambiguous reference to the stack.

EXAMPLE 5

Exemplary Ambiguous Stack References

Ambiguous references to the stack can include a reference to a stack location when the height of the stack is unknown or ambiguous. A call to a target function can also comprise one or more ambiguous stack references because the call may involve passing parameters that are on the stack, but it is unknown how many, if any, parameters the call passes via the stack. In such a case, an explicit reference to the stack is missing and is thus considered ambiguous. In some cases, no parameters may be passed; however, determining that no parameters have been passed is useful for resolving ambiguities.

EXAMPLE 6

Exemplary Unambiguous Stack References

Unambiguous references to the stack can include a stack location or a relative stack location. For example, sometimes the top of the stack at a particular point in the instructions (e.g., entry into a function) is referred to as '0'. Locations further down the stack are sometimes referred to based on their distance (e.g., in bytes) from the top. For example, if a stack is measured in 4-byte (e.g., 32-bit) increments, two parameters at the top of the stack may be in locations '0' and '−4'. However, the technologies can be applied to a stack measured in any size increments.

For purposes of illustration or analysis, it is sometimes helpful to assign labels or other identifiers to stack locations. For example, identifiers such as a, b, c, etc. or $t_1, t_2, t_3$, etc. can be used.

EXAMPLE 7

Exemplary Low Level Code

In any of the examples described herein, low level code can take the form of native software code (e.g., machine code compiled for a processor, machine code compiled for a virtual machine, or other compiled code) or assembly software code. Such code is sometimes referred to as a program "binary." Low level code can include machine-specific code.

Instructions in low level code typically manipulate low level variables, such as machine registers and memory locations.

In practice, low level code may be represented in a low level intermediate representation format (e.g., LIR), such as a format that represents an instruction (e.g., opcode) and zero or more associated operands (e.g., without operands for parameters passed to target functions). Any of the technologies described herein can be applied to such an intermediate representation or other representation of the low level instructions.

One of the possible characteristics of low level code is that certain references to the stack, such as calls to functions, may be ambiguous (e.g., not explicitly indicated or missing in the code).

EXAMPLE 8

Exemplary Higher Level Code

In any of the examples described herein, higher level code can take the form of a representation of software instructions at a level higher (e.g., closer to or more like source code) than that of the associated low level code. For example, the higher level code can be in the format of an intermediate representation. Such a representation may represent instructions via an opcode and zero or more associated operands (e.g., parameters passed to target functions).

In practice, higher level code may resemble that of low level code (e.g., assembly instructions), but indicate unambiguous references to the stack, such as in calls to functions. Such unambiguous references can be to a stack location or a higher level variable associated with a stack location.

If desired, instructions in higher level code can manipulate higher level variables, such as name-labeled variables. In practice, name-labeled variables can be implemented as registers, memory locations, or both. However, if desired, such implementation is transparent to (e.g., not represented in) the higher level code.

Static analysis techniques can be applied to the higher level representation of any of the examples described herein.

EXAMPLE 9

Exemplary Stack-Height-Altering Behavior

In any of the examples herein, a target function may engage in stack-height-altering behavior (e.g., pushing or popping arguments off the stack). Depending on calling conventions, the stack may be manipulated in various ways by the calling code or the called code. Thus, a call to the, target function can result in stack-height-altering behavior. The size and contents of the stack can be changed.

A common form of stack-height-altering behavior is to pop arguments off the stack as a source of input parameters. In this way, the stack serves as an inter-function communication mechanism. The technologies described herein can be used with a variety of calling conventions.

In any of the examples herein, determining stack-height-altering behavior of a call to a target function can include determining how many parameters are passed in a call to the target function. In some cases, determining how many can comprise determining that zero parameters are passed.

EXAMPLE 10

Exemplary Calls to Target Functions

A call to a target function can involve a variety of processing, depending on calling conventions. Sometime the word "call" is used to mean the processing that includes the return from the call (e.g., popping arguments off the stack or cleaning up the stack after the call).

EXAMPLE 11

Exemplary Raising Tool

Figure 4:
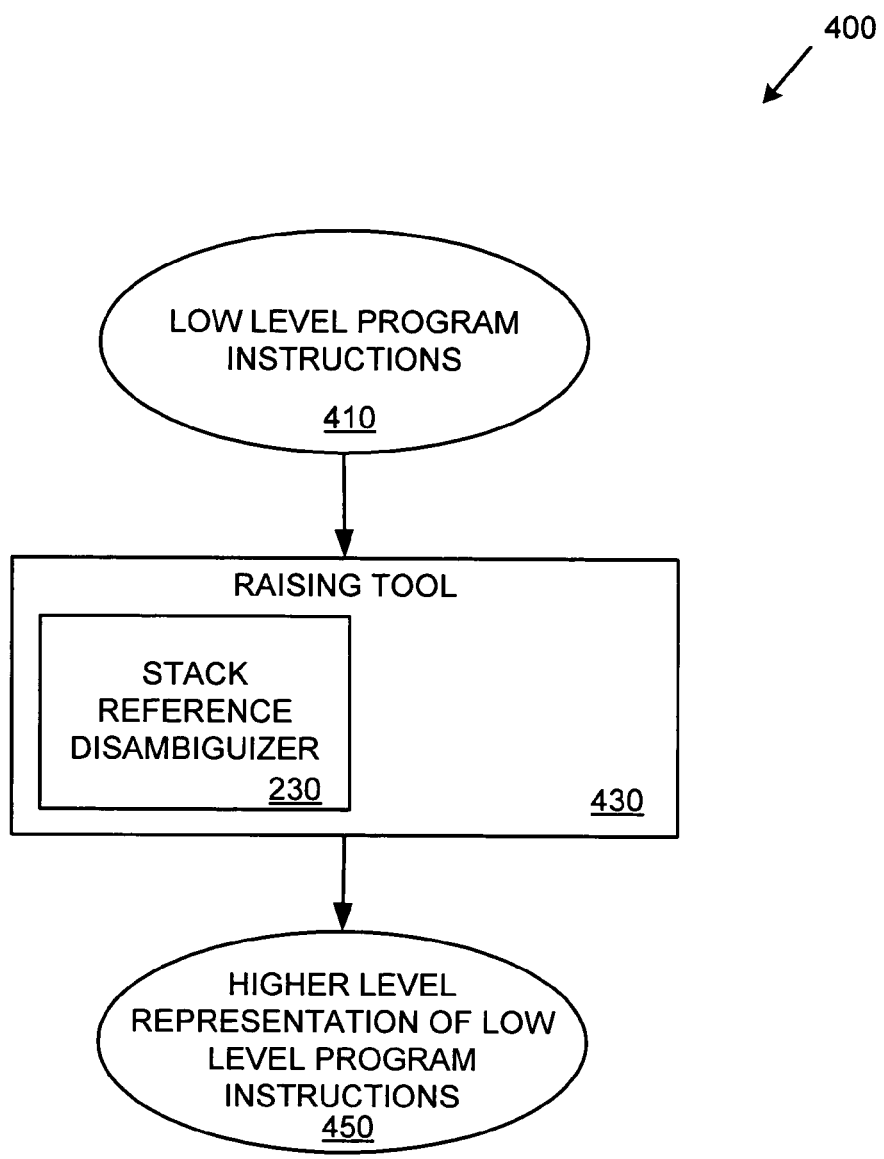
FIG. 4 is a block diagram showing an exemplary program instruction raising tool.

FIG. 4 shows an exemplary instruction raising system 400. In the example, a raising tool 430 receives one or more low level program instructions 410 (e.g., with one or more ambiguous references to the stack, such as calls to functions). The raising tool 430 can include the stack reference disambiguizer 230 of FIG. 2.

The raising tool 430 can output a higher level representation 450 of the low level program instructions (e.g., with at least one unambiguous reference to the stack for the one or more ambiguous references to the stack).

EXAMPLE 12

Exemplary Method

Figure 5:
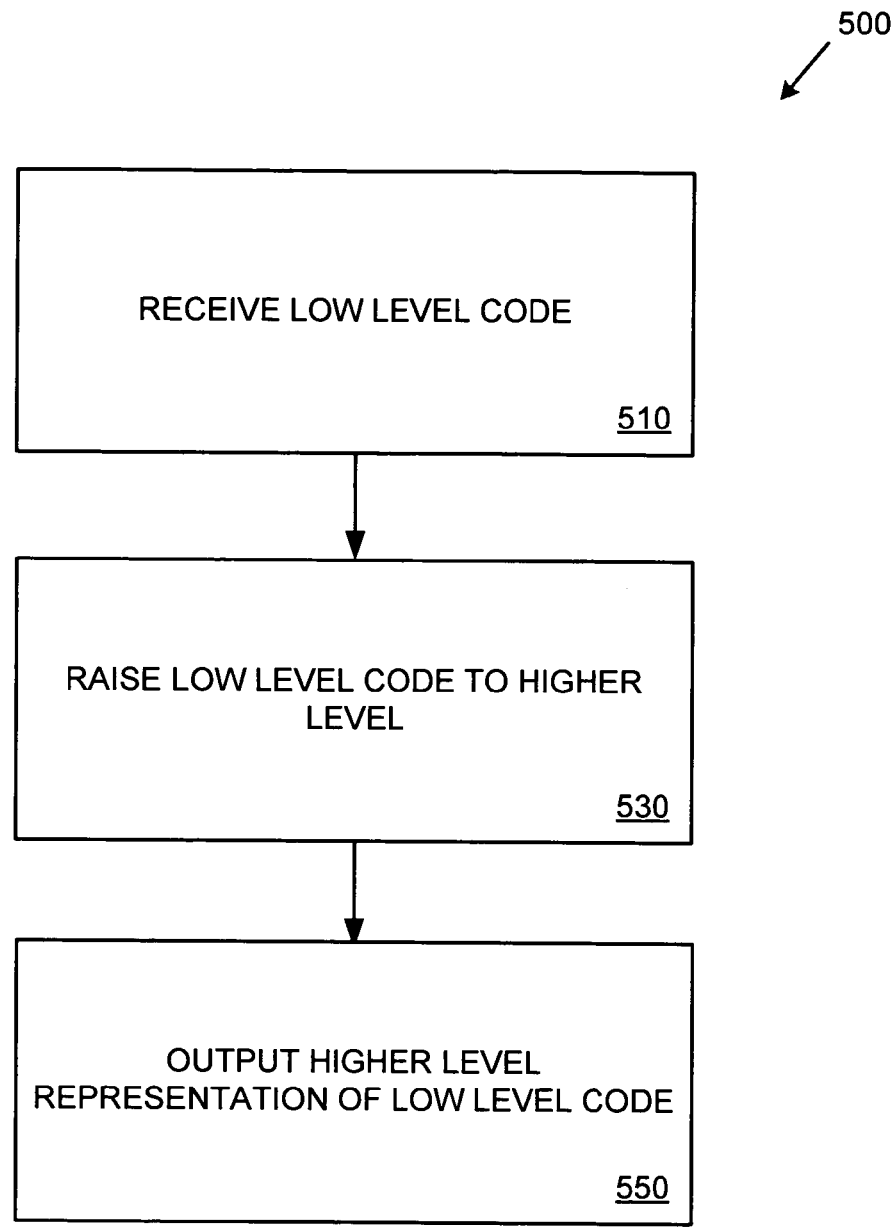
FIG. 5 is a flowchart illustrating an exemplary method for raising program instructions.

FIG. 5 shows an exemplary method for 500 raising low level program instructions (e.g., containing one or more ambiguous reference(s) to the stack, such as one or more calls to one or more functions). At 510, one or more low level program instructions (e.g., with one or more ambiguous references to a stack) are received. At 530, the low level instructions are raised to a higher level. At 550, a higher level representation of the low level instructions is output. The higher level representation can include at least one unambiguous reference to the stack for the one or more ambiguous references to the stack found in the low level instructions. Techniques of the method 300 described in Example 4 can be used.

Any of the techniques described herein can be used to determine the unambiguous references for inclusion in the higher level instructions.

EXAMPLE 13

Exemplary Raising Tool with Mapping

Figure 6:
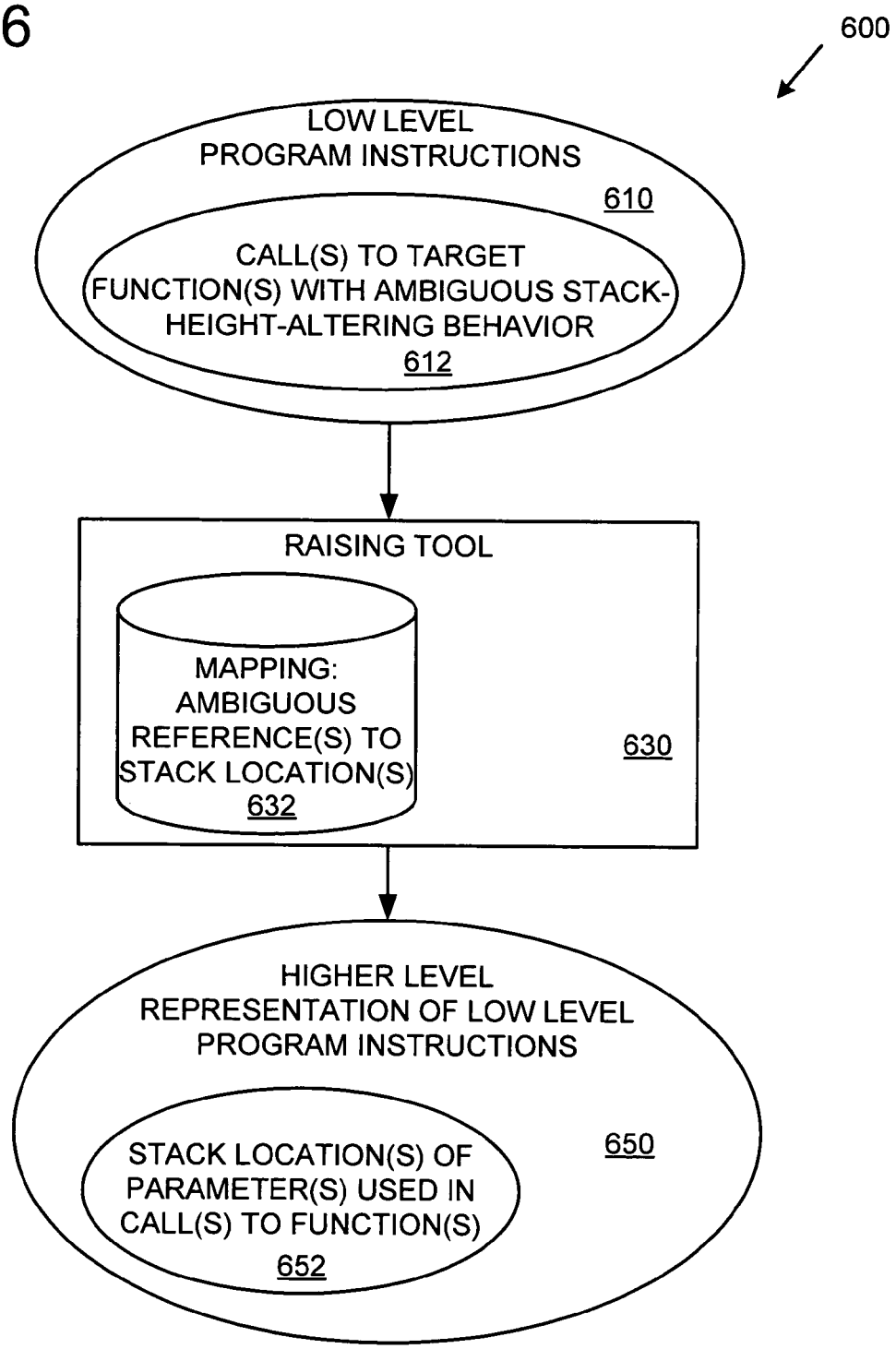
FIG. 6 is a block diagram showing an exemplary program instruction raising tool that outputs unambiguous references to a stack.

FIG. 6 shows an exemplary instructions raising system 600 that uses a mapping 632. In the example, a raising tool 630 (e.g., such as that shown in FIG. 4) receives one or more low level program instructions 610 with one or more calls to one or more target functions (e.g., the calls having ambiguous stack-height-altering behavior). The raising tool 430 can include the stack reference disambiguizer 230 of FIG. 2 (not shown). A mapping 632 from an ambiguous reference to the stack (e.g., a function call without explicit indication of parameters) to a stack location can be stored in the mapping 632 for one or more such ambiguous references to the stack.

The raising tool 630 can output a higher level representation 650 of the low level program instructions, comprising one or more stack locations 652 of one or more parameters used in one or more calls to one or more functions in the low level program instructions 610. The stack locations are unambiguous stack references and can be indicated via a relative location within the stack or by a label or other identifier.

Another mapping (not shown) can map locations to an associated label or other identifier if desired.

EXAMPLE 14

Exemplary Method for Raising Software Instructions via Mapping

Figure 7:
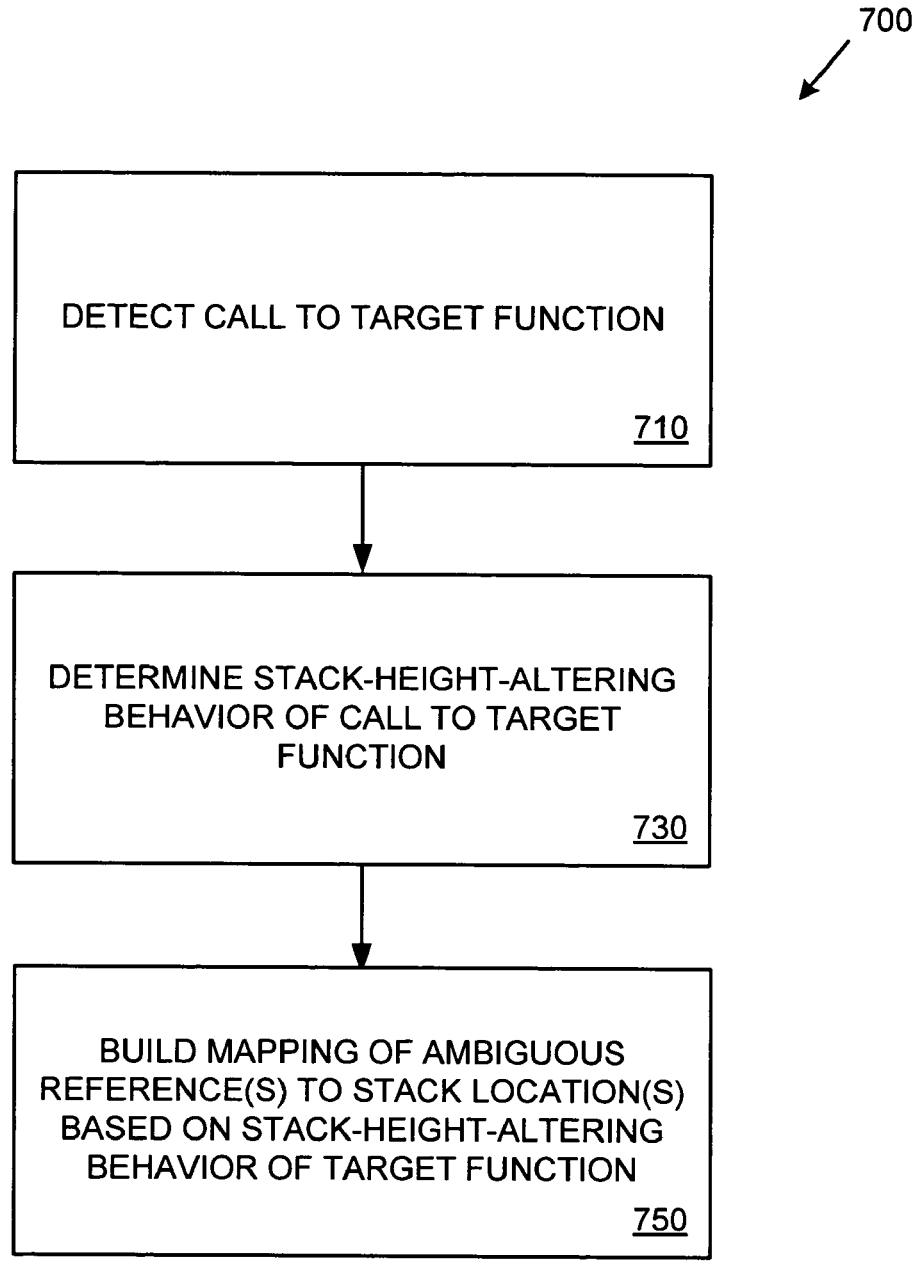
FIG. 7 is a flowchart showing an exemplary method for finding unambiguous stack references.

FIG. 7 shows an exemplary method 700 for raising software instructions via a mapping. At 710, a call to a target function (e.g., a low level instruction) is detected. The stack-height-altering behavior of the call to the function may be ambiguous (e.g., involve passing an unknown number of parameters via the stack).

At 730, the stack-height altering behavior of the call to the target function is determined (e.g., via any of the techniques described herein). For example, the number of parameters passed by the function can be determined.

At 750, a mapping of ambiguous references to stack locations (e.g., parameters used in the call to the target function) to stack locations can be built, based on the stack-height-altering behavior of the target function. During the analysis, a current stack height can be tracked to assist in determining the mapping.

The mapping can be used for constructing a higher level representation of the instructions.

EXAMPLE 15

Exemplary Method for Raising Software Instructions via Mapping

Figure 8:
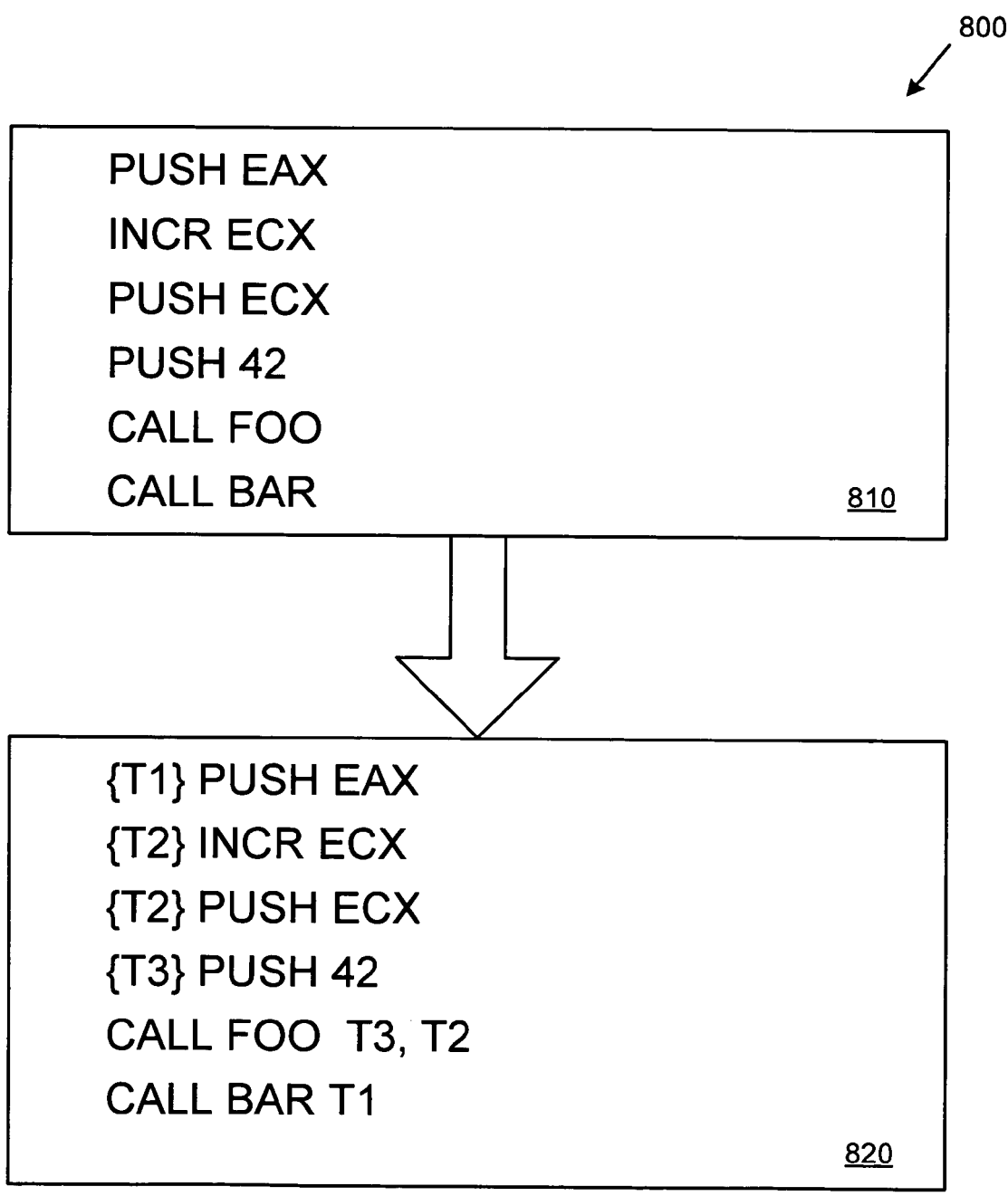
FIG. 8 is a block diagram showing exemplary software instructions before and after raising.

FIG. 8 shows an exemplary block diagram 800 showing exemplary software instructions before and after raising. The low level instructions 810 include ambiguous stack references in the calls to target functions foo and bar. After applying the techniques described herein, a raised version 820 of the instructions indicates stack locations for the calls. In the example, it has been determined that the call to foo passes two parameters (e.g., the call to foo alters the stack by consuming two parameters) and the call to bar passes one parameter (e.g., the call to bar alters the stack by consuming one parameter).

Although labels are shown (e.g., $t_1$, etc.), stack locations can be indicated in some other way (e.g., by a number or relative number indicating where in relation to the top of the stack (at the time of entry into the instructions) the parameters reside).

EXAMPLE 16

Figure 9:
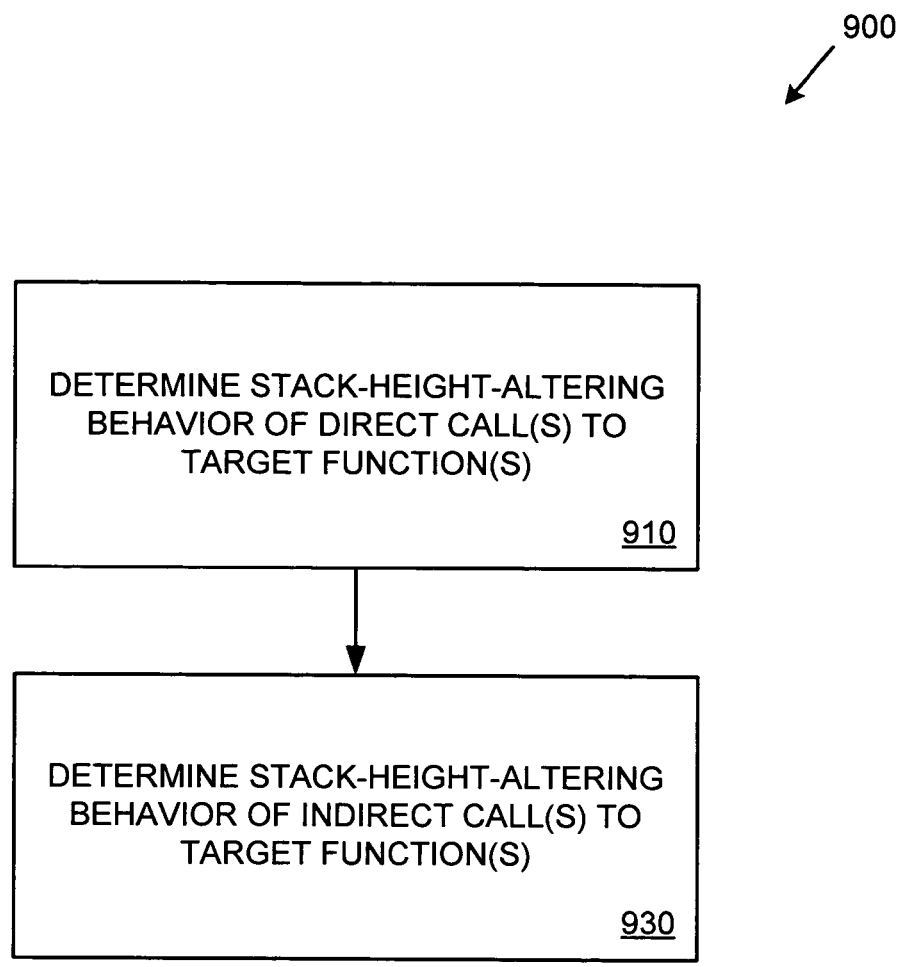
FIG. 9 is a flowchart showing an exemplary method of determining stack-height altering behavior for instructions including both direct and indirect function calls.

Exemplary Application of Stack-Height-Altering Behavior of Direct and Indirect Calls FIG. 9 is a flowchart showing an exemplary method 900 of determining stack-height-altering behavior for both direct and indirect calls to target functions, which can be used with any of the examples described herein.

At 910, the stack-height-altering behavior for one or more direct calls to one or more target functions is determined. At 920, the stack-height-altering behavior of one or more indirect calls to one or more target functions is determined.

EXAMPLE 17

Figure 10:
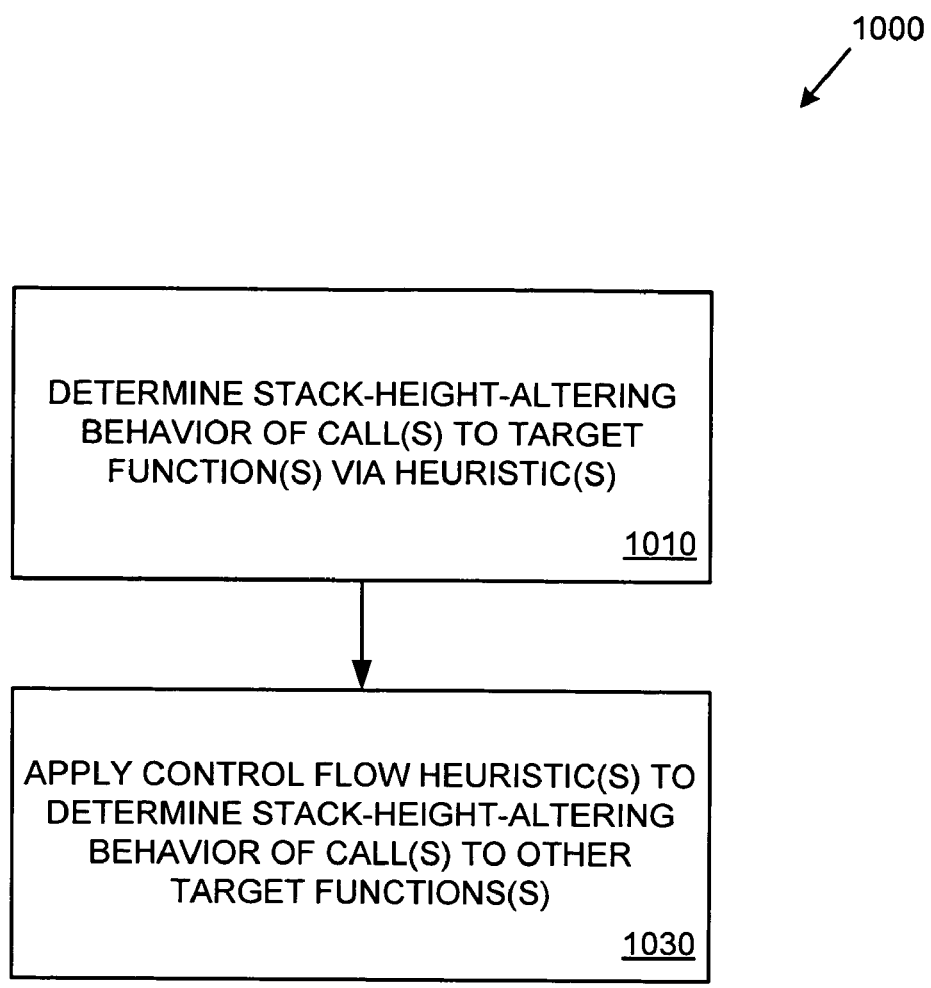
FIG. 10 is a flowchart showing an exemplary method of determining stack-height-altering behavior of indirect calls.

Exemplary Application of Heuristics to Determine Stack-Height-Altering Behavior of Calls to Target Functions FIG. 10 is a flowchart showing an exemplary method 1000 of determining stack-height-altering behavior of indirect calls to target functions (e.g., for use in 930 of FIG. 9). At 1010, any of the indirect call heuristics (e.g., non-control flow heuristics) described herein can be used to determine the stack-height-altering behavior of one or more calls to one or more target functions.

At 1030, control flow heuristics can be applied to determine the stack-height-altering behavior of one or more calls to one or more other target functions (e.g., the target functions for which the other heuristics could not determine the stack-height-altering behavior).

EXAMPLE 18

Exemplary Other Instructions that Alter Stack Height

Although a call to a function may result in alterations to the stack height due to passing parameters, other instructions can alter the stack height. Such instructions include push, pop, and alloca. When n determining or interpolating relative stack height, the stack-height-altering behavior of such instructions can be accounted for.

EXAMPLE 19

Exemplary Other Instructions that Refer to the Stack

Although a call to a function may result in passing parameters, which are found with reference to the stack, other instructions can refer to the stack. For example, the load effective address instruction lea can refer to the stack (e.g., via the esp register). Such a reference may be ambiguous because the relative height of the stack is not known.

EXAMPLE 20

Exemplary Technique for Interpolating Stack Height

When determining stack-height-altering behavior of a call to a function, it is sometimes useful to interpolate stack height at various points within the calling code. For example, if the height is known to be a particular value at a starting point (e.g., SSentry) and is known to be a particular value at an ending point (e.g., SSexit), and there is only one function call between the starting point and the ending point, it can be assumed that the stack-height-altering behavior of the function call is the difference between SSentry and SSexit. Such interpolation can take into account the stack-height-altering behavior of other instructions that alter stack height.

The stack height at certain points within a function may be known, or relatively known. Such points can be used as seed points. The seed points can sometimes be propagated throughout a calling function.

For example, depending on calling conventions, the relative height of the stack at the entry of a function can be assumed to be 0. Similarly, the relative height of the stack at the exit of the same function can be assumed to be 0.

EXAMPLE 21

Exemplary Application of Interpolation

Figure 11:
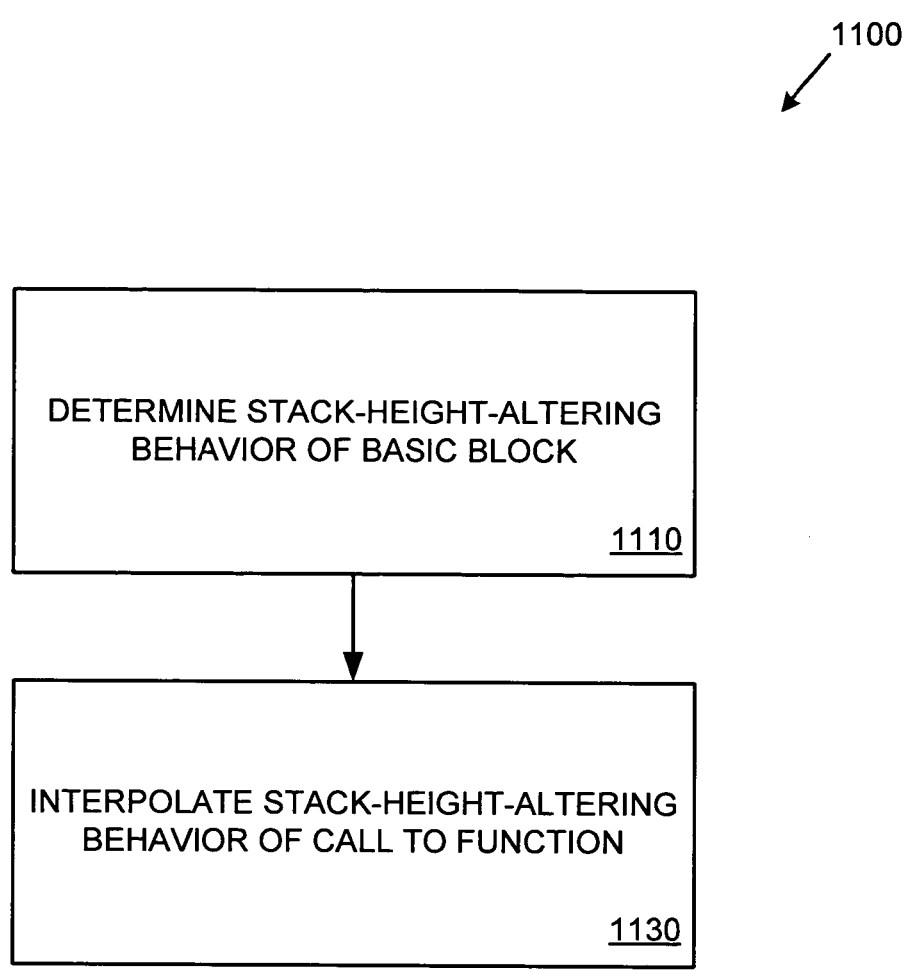
FIG. 11 is a flowchart showing an exemplary method of determining stack-height-altering behavior for a set of instructions via interpolation.

FIG. 11 is a flowchart showing an exemplary method 1100 for determining stack-height altering behavior for a set of instructions via interpolation, which can be used with any of the examples described herein.

At 1110, the stack-height-altering behavior of a set of instructions (e.g., a basic block) comprising a call to a target function is determined. Then, at 1130, the stack-height-altering behavior of the call to the target function can be determined by interpolation. For example, the stack-height-altering behavior of other instructions can be accounted for.

In some cases, extrapolation can also be used. For example, if the stack-height-altering behavior of a call to a target function is known, the relative stack height after execution of other instructions altering the stack height can be extrapolated.

EXAMPLE 22

Exemplary Application of Techniques

Any of the techniques described herein can be applied at the function level so that the analysis is performed for a single function (e.g., calling function). In such a way, certain advantages can accrue, such as being able to propagate seed points throughout the function via techniques such as the control flow heuristic described herein.

For code comprising more than one function, the analysis can proceed on a function-by-function basis. Note that analysis of internal instructions for all target functions may not be desirable or necessary.

EXAMPLE 23

Exemplary Heuristic: Direct Calls

In any of the examples herein, a heuristic for direct calls can be used to obtain information about stack-modifying behavior. Because the code for a direct call can be located, the target function can be identified, and instructions for the target function can be inspected. Certain instructions (e.g., return instructions) can indicate how many parameters are being popped off the stack when the call returns.

Figure 12A:
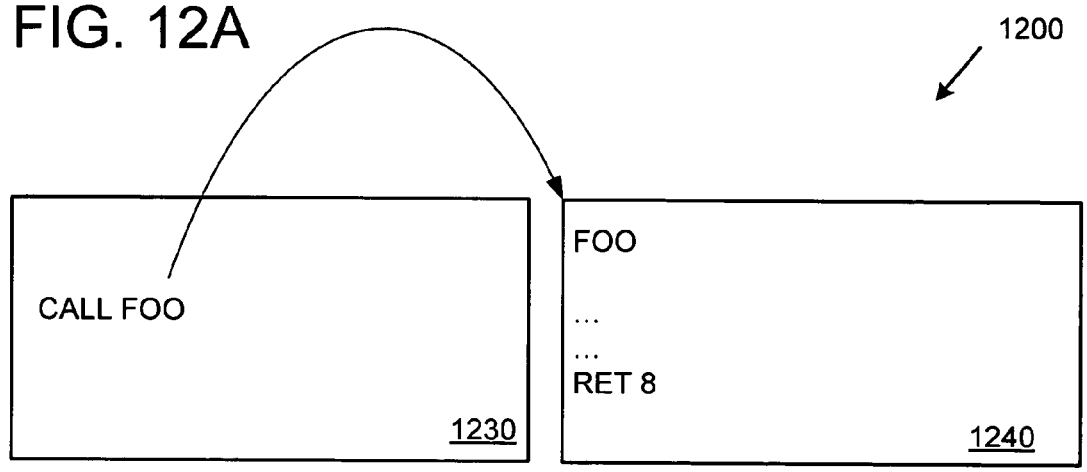
FIG. 12A is block diagram showing an exemplary direct call.

For example, in an x86 implementation, the heuristic can find the appropriate RET instruction, which will indicate how many, if any, instructions are being popped off. FIG. 12A shows an exemplary direct call scenario 1200 involving a direct call from calling instructions (e.g., a calling function) 1230 to a target function foo 1240. In the example, the RET instruction reads:

RET 8

In the example, two parameters (e.g., in a 32-bit architecture) are being popped off the stack. Thus, the stack-height-altering behavior of a call to the function has been determined.

Figure 12B:
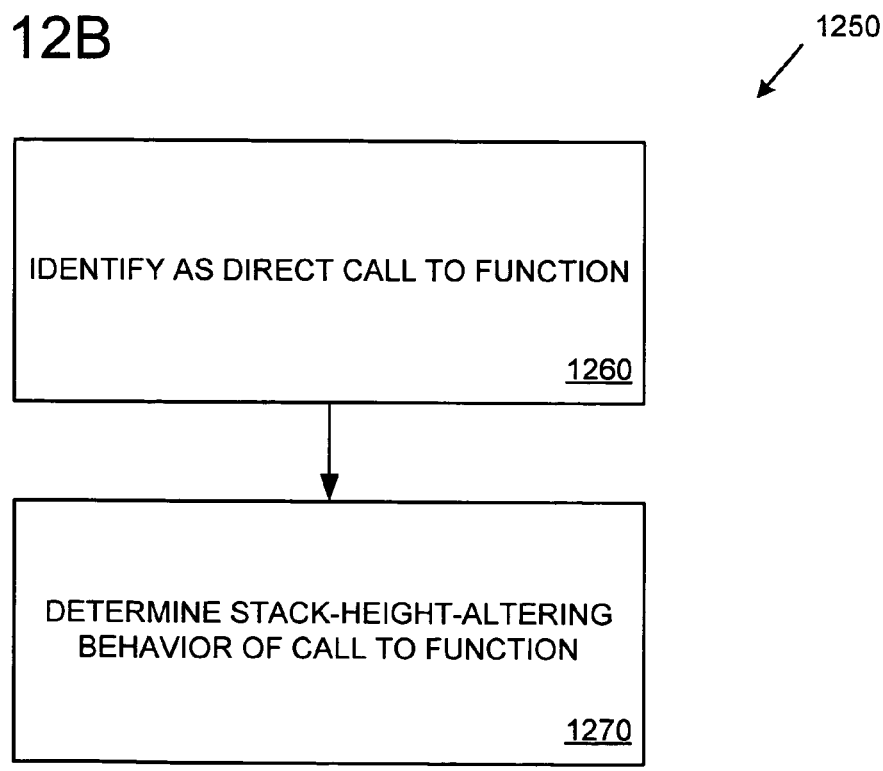
FIG. 12B is a flowchart showing an exemplary direct call heuristic.

FIG. 12B shows an exemplary method 1250 for determining the stack-height-altering behavior of a direct call to a target function. At 1260, the call is identified as a direct call to a target function. At 1270, the stack-height-altering behavior of the direct call to the target function is determined (e.g., via a return instruction).

In some cases, a function may have exception handling instructions. If there are no such instructions, a first return instruction can be used to determine the stack-height-altering behavior. If there are exception handling instructions, the control flow can be walked to find the appropriate return instructions, which can be used to determine the stack-height-altering behavior.

EXAMPLE 24

Exemplary Heuristic Set: Indirect Calls

Some function calls are indirect in that the low level code does not directly indicate which function is to be called. For example, instead, the address of the target function may be stored in a register or memory location. A call to a dynamically linked function is an example of an indirect call. A set of heuristics can be used to determine the stack-modifying behavior of such indirect calls.

FIG. 13 is a flowchart showing an exemplary method 1300 of applying a variety of indirect call heuristics. At 1310, a dataflow-to-target-function heuristic is applied. At 1330, a dataflow-to-target-function-type heuristic is applied. At 1350, an import name heuristic is applied. At 1370, a cleanup instructions heuristic is applied. Exemplary implementations of such heuristics are described below.

EXAMPLE 25

Exemplary Indirect Call Heuristic: Dataflow to Target

A possible indirect call heuristic that can be used in any of the examples described herein involves performing a dataflow analysis to find the target function. Such a technique can be applied, for example, when the address of a target function is stored in a register or memory location.

Figure 14A:
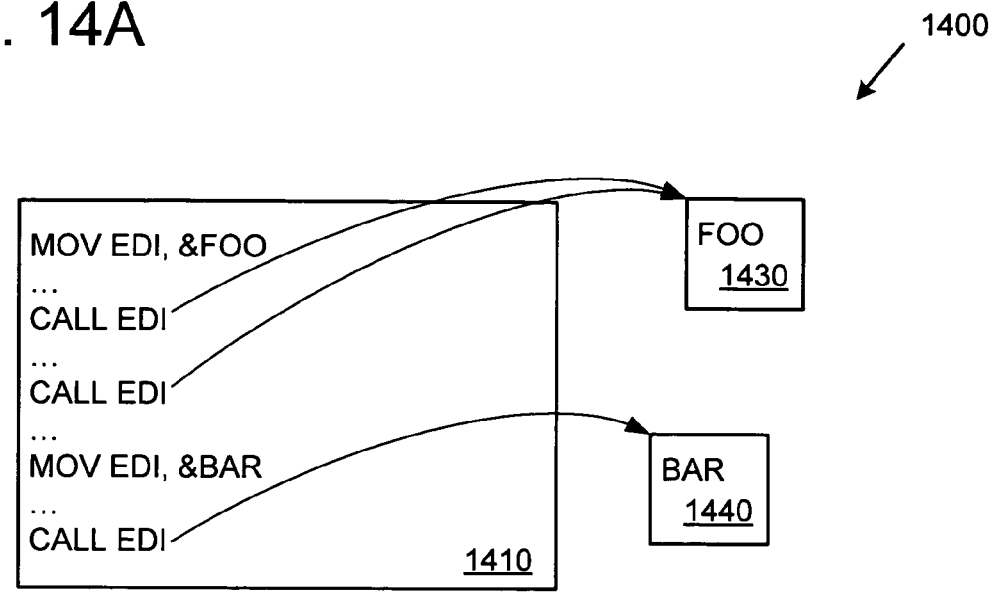
FIG. 14A is block diagram showing an exemplary indirect call.

An exemplary indirect call scenario 1400 is shown in FIG. 14A. In the example, an indirect call from calling instructions (e.g., a calling function) 1410 uses a register to store the address of the target function. The address for the target function foo 1430 is stored in the edi register, and then a call is made to the target function as indicated in the edi register. Subsequently, a call is made to the target function bar 1440 in a similar fashion.

Figure 14B:
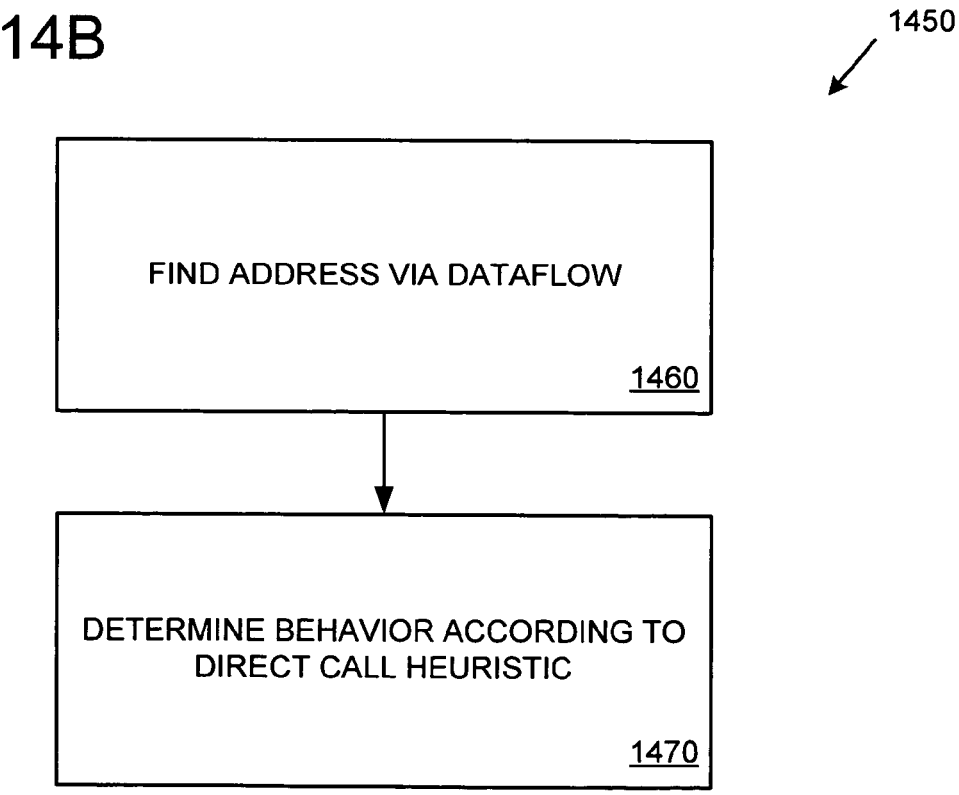
FIG. 14B is a flowchart showing an exemplary method of applying a data-flow-to-target function to determine the stack-height-altering behavior of an indirect call, such as that shown in FIG. 14A.

FIG. 14B shows an exemplary method 1450 for determining the stack-height-altering behavior of the indirect call to a target function. The call can be identified as an indirect call whose address can be determined via dataflow. At 1460, the address if found via a dataflow analysis. Then, at 1470, the stack-height-altering behavior of the call is determined via the direct call heuristic (e.g., because the target function has been identified).

EXAMPLE 26

Exemplary Indirect Call Heuristic: Dataflow to Target Type (Virtual Function)

A possible indirect call heuristic that can be used in any of the examples described herein involves using dataflow to determine an object type when a call is made to a virtual function. FIG. 15 shows an exemplary portion of source code 1510 for an exemplary indirect call scenario involving a call to a virtual function. In the example, a pointer p points to an instance of the object foo, which is created by the constructor foo maker. Bar is a virtual function of foo. So, the line p->bar( ); invokes the virtual function.

A low level (e.g., compiled) version 1520 of the code 1510 is shown in FIG. 15B. In the example, eax is loaded with the address of the instance of foo (e.g., it is a pointer to this). In practice, there may be other levels of indirection.

The subsequent instructions set up an exemplary implementation of a call to the virtual function. The address of the virtual function can be determined via the offset (e.g., 8) into the method table indicated in the call instruction of the low level instructions. A different technique for implementing the virtual function can be used, and a heuristic can handle such implementations accordingly.

FIG. 15C shows an exemplary method 1550 for determining the stack-height-altering behavior of the indirect call to the virtual function. The call can be identified as an indirect call to a virtual function (e.g., by recognizing the foo constructor and subsequent pattern of instructions).

At 1560, the this pointer to the instance of foo is found via dataflow analysis. In the example, the foomaker function flows to ecx. The dataflow analysis can find the type of object (e.g., foo) created (e.g., by the object constructor).

At 1570, the function address can be found via the this pointer and the offset into the method table. In the example, the offset is 8, which indicates where the bar function can be found.

Then, at 1580, the stack-height-altering behavior of the call can be determined via the direct call heuristic (e.g., because the target function bar has been identified).

In a virtual function scenario, there may be other versions of the virtual function to which the call may refer. However, it can be assumed that if one is found, the stack-height-altering behavior of the others will be the same.

Although the above example shows identifying a constructor to determine the type, the type can be obtained in other ways. For example, the type can be gleaned from a return from any function, a parameter (e.g., to a local function) for which a program database (e.g., the PDB) has the type, a local variable, or a global variable.

EXAMPLE 27

Exemplary Indirect Call Heuristic: Import Name

An indirect call heuristic that can possibly be used in any of the examples described herein involves using an import name. In some compiler implementations, the compiler will include a notation indicating the number of arguments expected by a function (e.g., to differentiate between two functions that have the same name but have different signatures). For example, when a compiler imports functions from an outside source (e.g., a DLL or other function linked at runtime), an import name may include the number of arguments expected (e.g., "_imp_foo@4", where the "4" indicates a single argument in an architecture accepting 4-byte arguments).

In such a case, the compiler-indicated value can be used to determine the stack-modifying behavior of the function. The import name can originate from various locations, such as in an associated program binary or in a program database (e.g., the PDB).

Figure 16A:
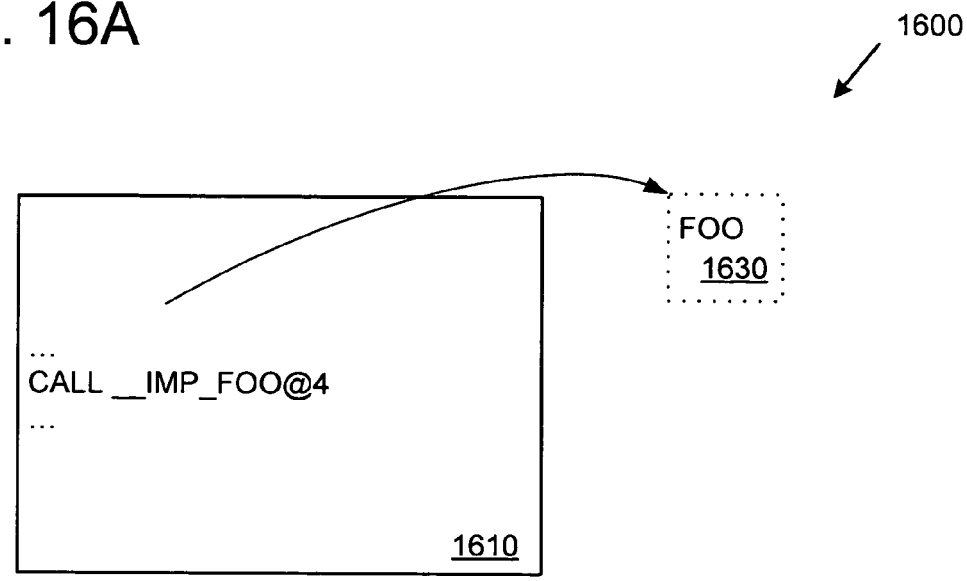
FIG. 16A is block diagram showing an exemplary indirect call involving an import name.

FIG. 16A shows an exemplary scenario 1600 with low level code 1610 involving a call to a function foo 1630 having an import name. Embedded in the import name "_imp_foo@4" is an indication of the number of parameters passed: 1 (e.g., based on a stack measured in 4-byte increments).

Figure 16B:
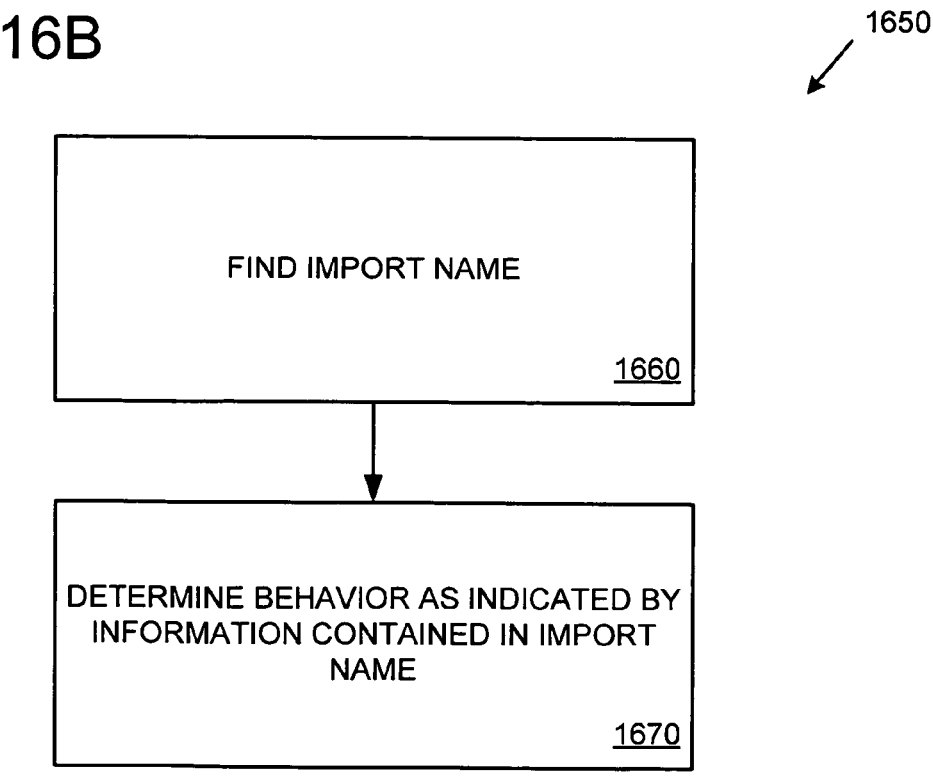
FIG. 16B is a flowchart showing an exemplary method for determining the stack-height-altering behavior of an indirect call involving an import name, such as that shown in FIG. 16A.

FIG. 16B shows an exemplary method 1650 for applying an import name heuristic. The call can be identified as involving an import name based on the format of the call.

At 1660, the import name of a target function is found. At 1670, the stack-height-altering behavior of the target function is determined as indicated by information contained in the import name.

The number of parameters can also be determined in this or any of the other examples. For example, if the import name indicates the number of bytes popped off the stack, and the parameters are typically pushed as 4-byte parameters, dividing a number embedded in the name by 4 will result in the number of parameters passed.

EXAMPLE 28

Exemplary Heuristic: Cleanup Instructions

Some functions include stack cleanup instructions that are intended to leave the stack in an original state (e.g., before the passed parameters were pushed onto the stack and the function was called). If so, such cleanup instructions can be detected to determine the stack-modifying behavior of the function. Depending on calling conventions, such stack cleanup instructions can be in a calling program.

For example, a call followed by an instruction to modify the stack pointer typically indicates stack cleanup instructions. An exemplary scenario 1700 shows low level instructions 1710 that include cleanup instructions. In the example, the stack has been cleaned up by adding 8 to it, indicating the stack-modifying behavior of a call to the function (e.g., 8 bytes were passed to the function).

Figure 17A:
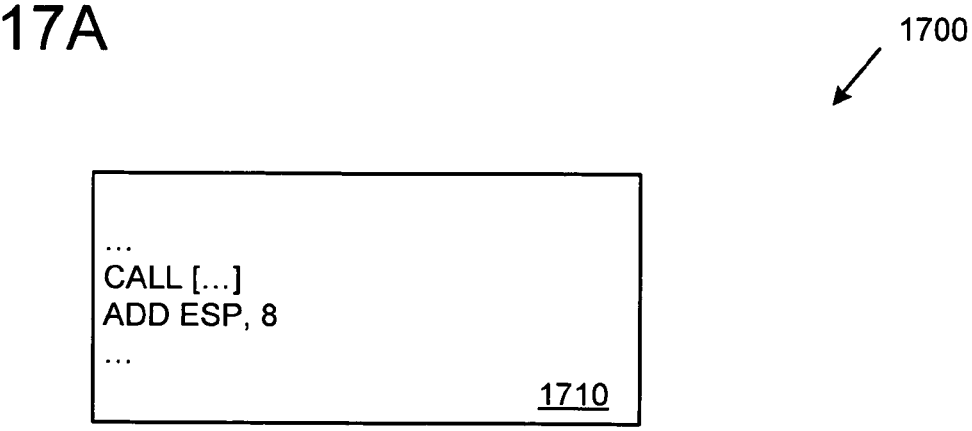
FIG. 17A is block diagram showing an exemplary indirect call involving stack cleanup instructions.
Figure 17B:
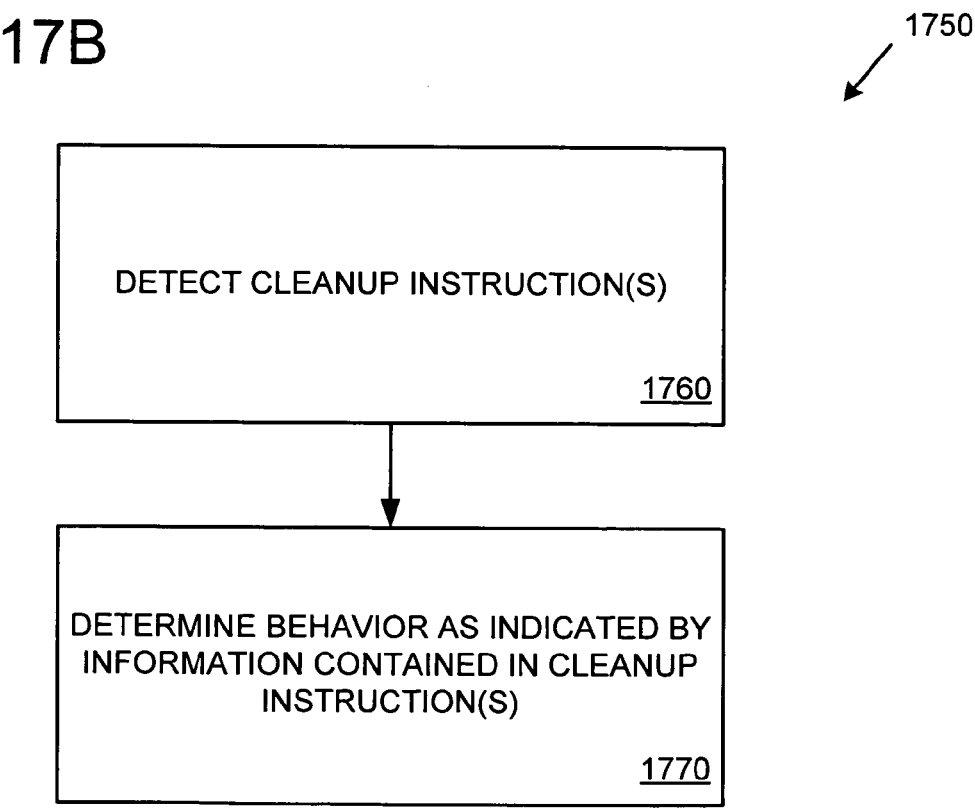
FIG. 17B is a flowchart showing an exemplary method for determining the stack-height-altering behavior of an indirect call involving stack cleanup instructions, such as that shown in FIG. 17A.

FIG. 17B shows an exemplary method 17B for applying a cleanup instructions heuristic. The call can be identified as involving cleanup by detecting the pattern of cleanup instructions (e.g., encountering a call immediately followed by an add esp, <cleanup size> instruction). At 1760, the cleanup instructions are detected. At 1770, the stack-height-altering behavior of the target function can be determined via the information contained in the cleanup instructions. For example, the number of bytes added to the stack indicates how many bytes are taken off the stack as a result of a call to the target function.

EXAMPLE 29

Exemplary Heuristic: Control Flow

Figure 18A:
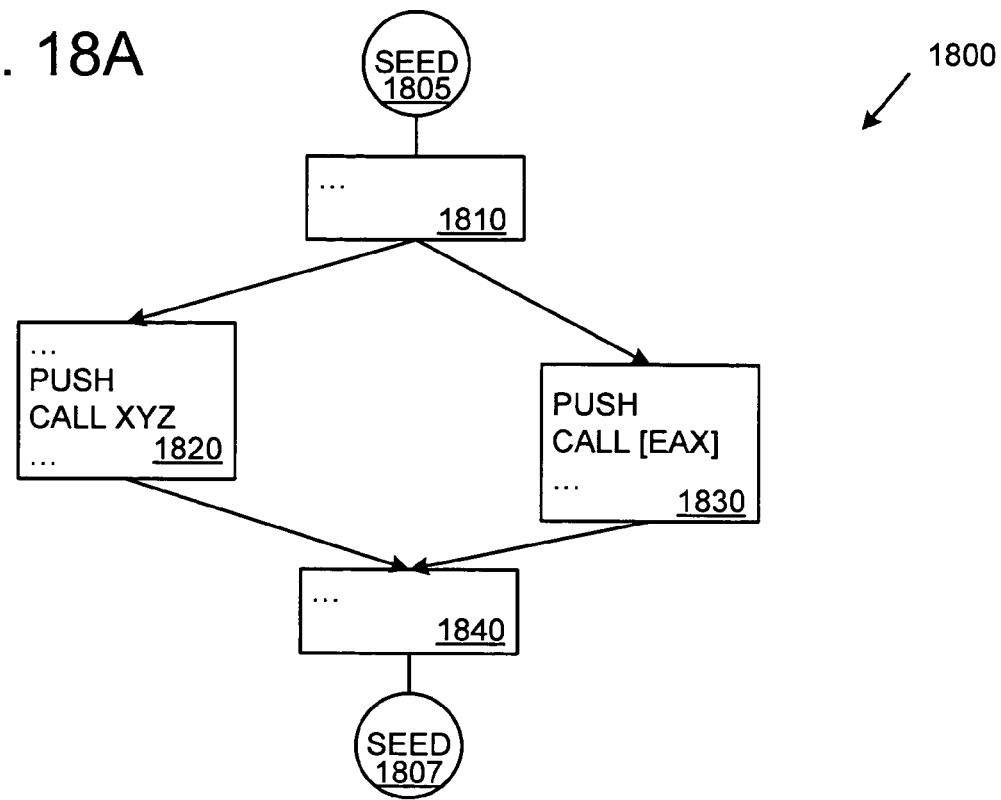
FIG. 18A is block diagram showing an exemplary use of seeds to determine the stack-height-altering behavior of a function comprising a plurality of basic blocks.

Information about stack-modifying behavior of a call to a function can be gathered from any of the examples described herein. For some remaining functions, the heuristics described thus far might not be sufficient. Still further information can be determined in light of control flow. FIG. 18A shows an exemplary function 1800 for which stack-height-altering behavior of some calls to target functions (e.g., a call to xyz) has been determined. The control flow heuristics can be applied even if no such information has yet been determined. For example, via a simple heuristic, the relative stack height at the seed points 1805 and 1807 can be assumed to be the same.

Based on the control flow heuristic described herein, the relative stack height at the entry and exit of the basic blocks 1810, 1820, 1830, and 1840 can be determined.

Figure 18B:
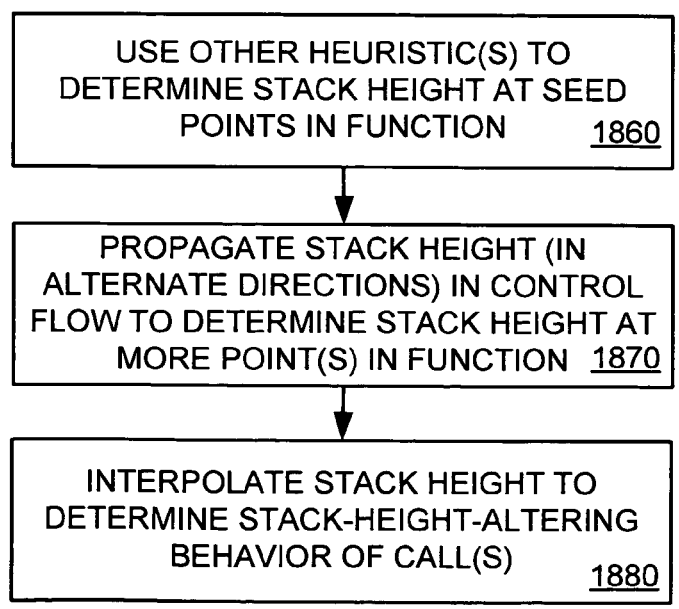
FIG. 18B is a flowchart showing an exemplary method of applying a control flow heuristic to determine the stack-height-altering behavior of calls to functions found in the instructions of a function having a plurality of basic blocks, such as that shown in FIG. 18A.

FIG. 18B shows an exemplary method 1850 for determining the stack-height-altering behavior of calls to functions found in the instructions of a function having a plurality of basic blocks, such as that shown in FIG. 18A.

At 1860, other heuristics, if any, are used to determine the relative stack height at seed points in the function. For example, it can be assumed that the relative stack height at the entry and exit of a function is the same (e.g., 0).

At 1870, the relative stack height can be propagated in the control flow to determine relative stack height at one or more points in the function. For example, seeds can be propagated in alternating directions (e.g., up and down) throughout the control flow.

At 1880, the relative stack height can be interpolated to determine the stack-height-altering behavior of calls (e.g., for which the behavior is not yet known).

EXAMPLE 30

Exemplary Application of a Control Flow Heuristic

Figure 19A:
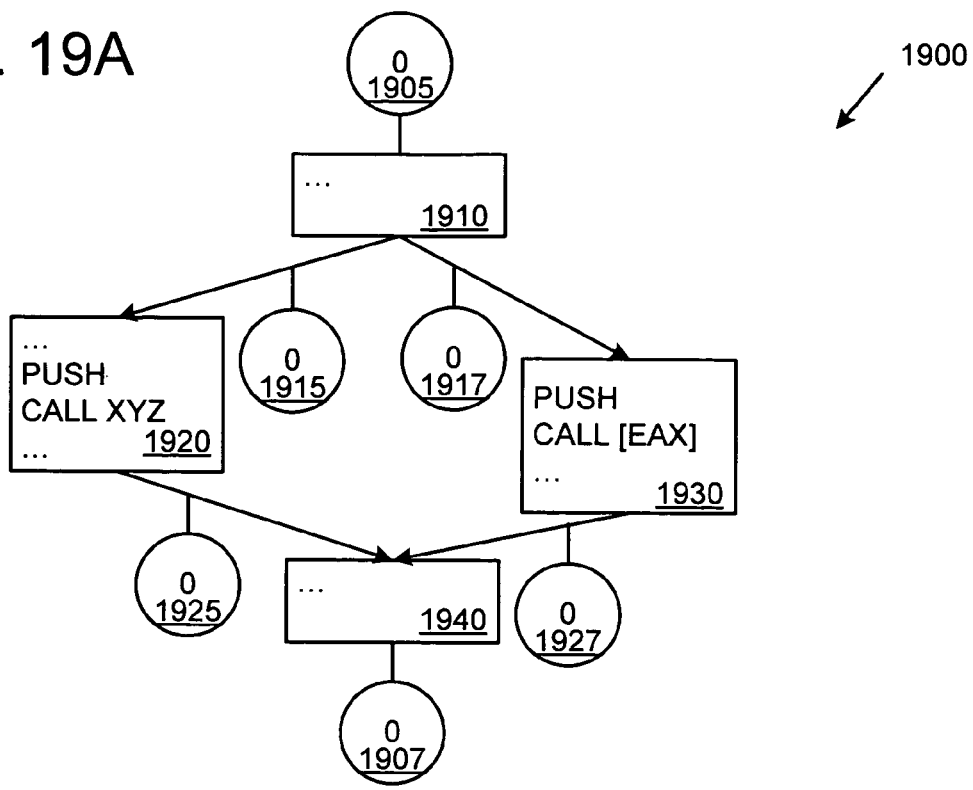
FIG. 19A is a block diagram showing propagation of stack height throughout basic blocks of a function, such as that shown in FIG. 18A.

FIG. 19 is a block diagram showing propagation of relative stack height throughout basic blocks of a function 1900, such as that shown in FIG. 18A. In the example, the relative stack height at the seed points 1905 and 1907 is assumed to be 0. Through a direct call heuristic, it has been determined that the call to xyz pops one argument (e.g., 4 bytes) off the stack. However, xyz's behavior need not be known to proceed.

Because it is detected that the basic blocks 1910 and 1940 do not contain any stack-height-altering instructions, the relative stack height can be propagated down the control flow from seed 1905 to location indicators 1915 and 1917. The relative stack height can also be propagated up the control flow from seed 1907 to location indicators 1925 and 1927. Because it is then known that the relative stack height at entry to the basic blocks 1920 and 1930 is 0, and the relative stack height at exit to the basic blocks 1920 and 1930 is 0, stack-height-altering behavior of the indirect call (i.e., call [eax]) can be determined via interpolation.

Figure 19B:
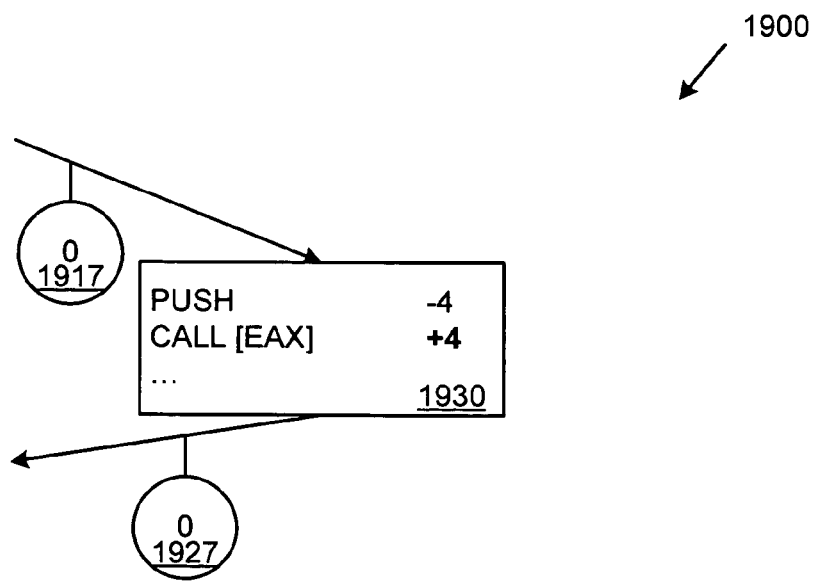
FIG. 19B is a block diagram showing interpolation of stack height within a basic block of a function, such as that shown in FIG. 18A.

As shown in FIG. 19B, the basic block 1930 also contains a push instruction, so the indirect call must consume one parameter (e.g., pop 4 bytes off the stack). A current relative height of the stack can be tracked when processing the instructions. In this way, a control flow heuristic can be used to determine the stack-height-altering behavior of calls for which the other heuristics have failed.

EXAMPLE 31

Exemplary Application of a Control Flow Heuristic

Figure 20:
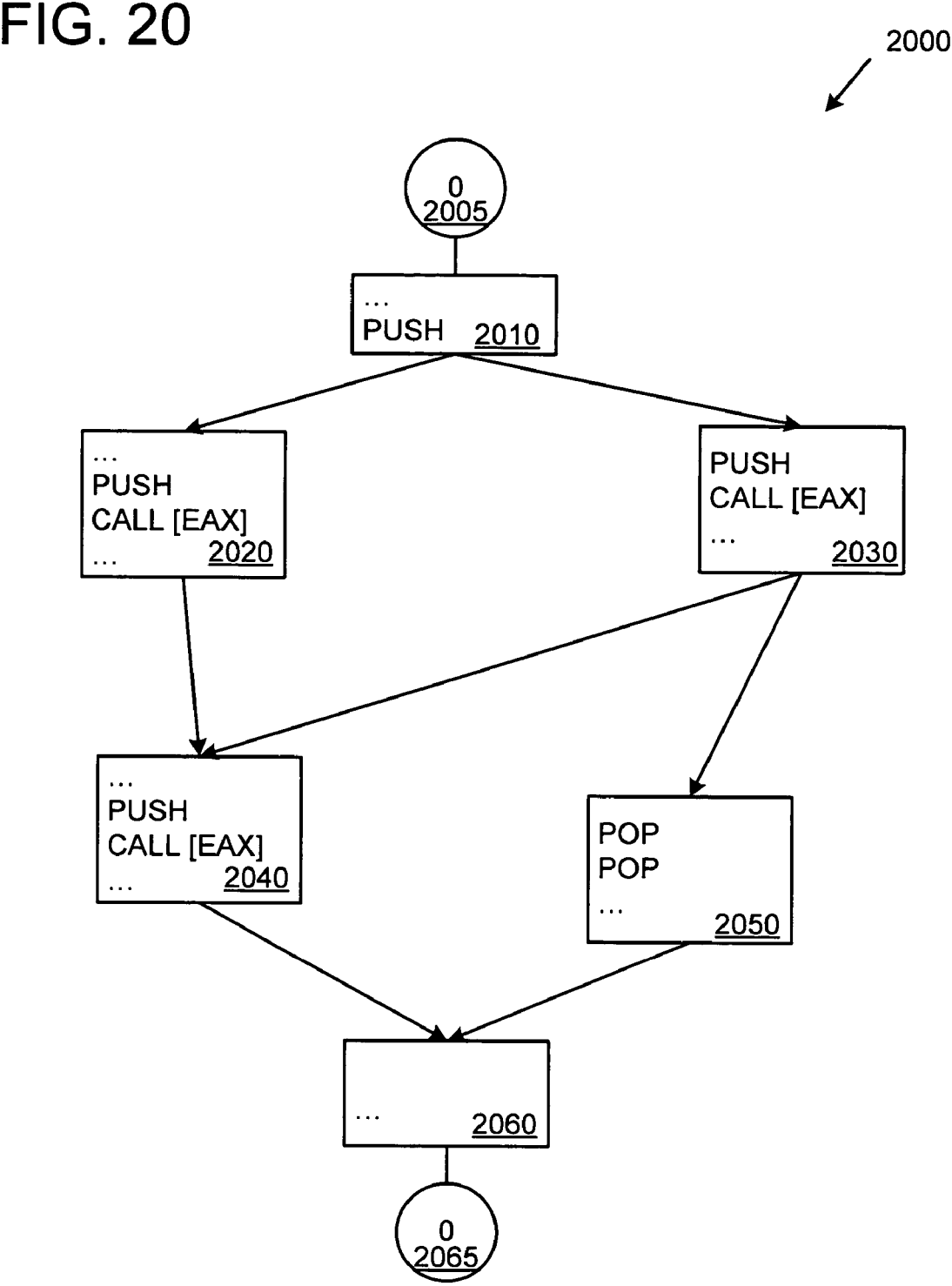
FIGS. 20, 21, 22, 23, and 24 are block diagrams showing propagation of stack height in alternate directions throughout basic block of a function.

The control flow heuristic can take advantage of the observation that relative stack height at entry to control flow joins should be the same. FIG. 20 shows an exemplary function 2000 having basic blocks 2010, 2020, 2030, 2040, 2050, and 2060. In the example, other heuristics have failed to determine the stack-height-altering behavior of any of the indirect calls shown. Two seeds of relative height 0 have been placed at 2005 and 2065.

Figure 21:
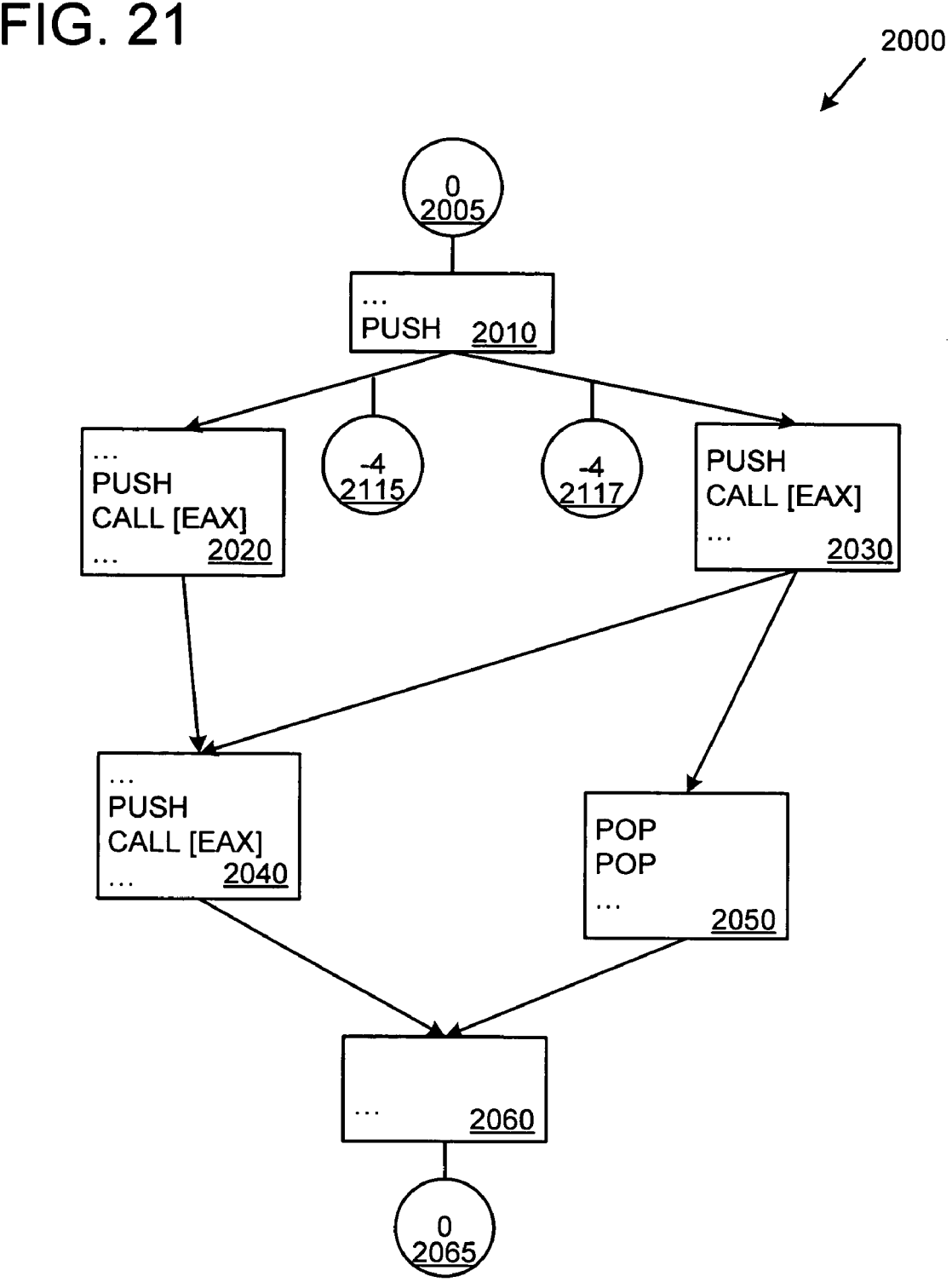

A downward traversal of the control flow to propagate the seeds is shown in FIG. 21. In the example, due to the push instruction detected in block 2010, it is known that the relative stack height is −4 following the push instruction at indicators 2115 and 2117. However, further traversal down the control flow is not possible.

Figure 22:
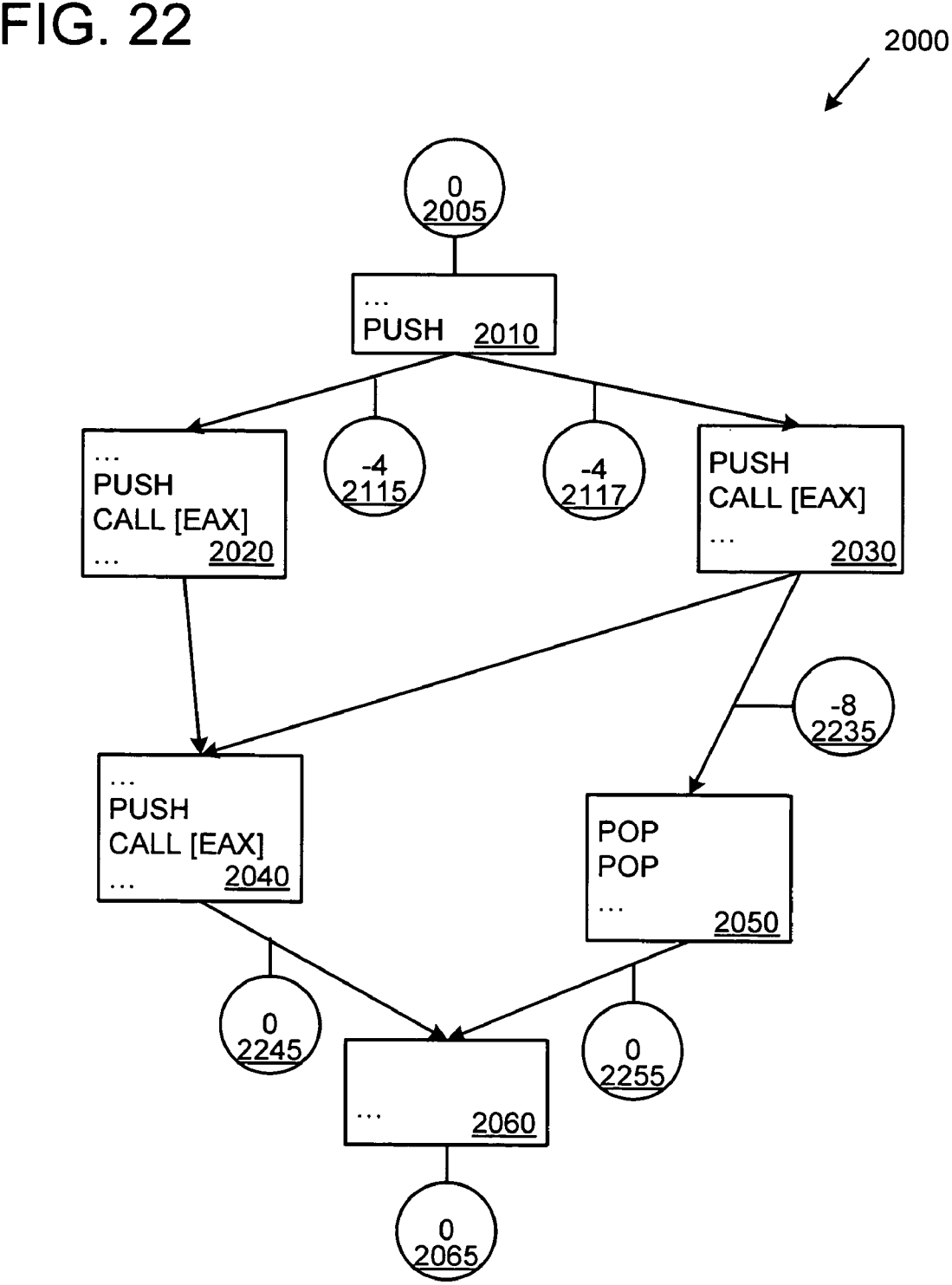

An alternate direction is now applied. An upward traversal of the control flow is shown in FIG. 22. Because there are no stack-height-altering instructions detected in block 2060, it is known that the relative stack height is 0 at indicators 2245 and 2255. Further, due to the two pop instructions of block 2050, it is known that the relative stack height is −8 at indicator 2235. However, further traversal up the control flow is not possible.

Figure 23:
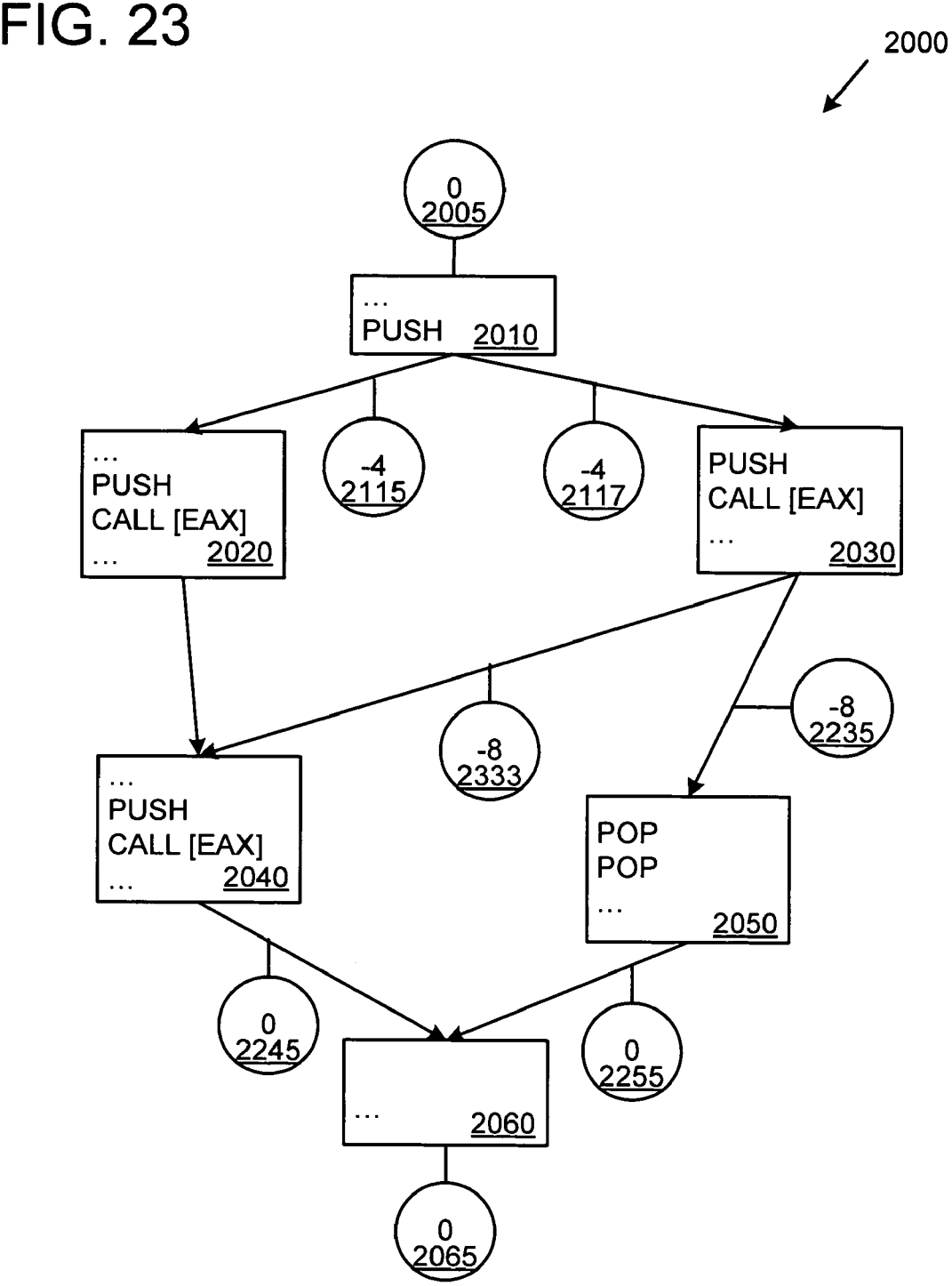

An alternate direction is now applied. A downward traversal of the control flow is shown in FIG. 23. Because the relative stack height at control flow joins must be the same, it is known that the relative stack height at indicator 2333 is −8 (i.e., the same as that for 2235). Further traversal is not possible.

Figure 24:
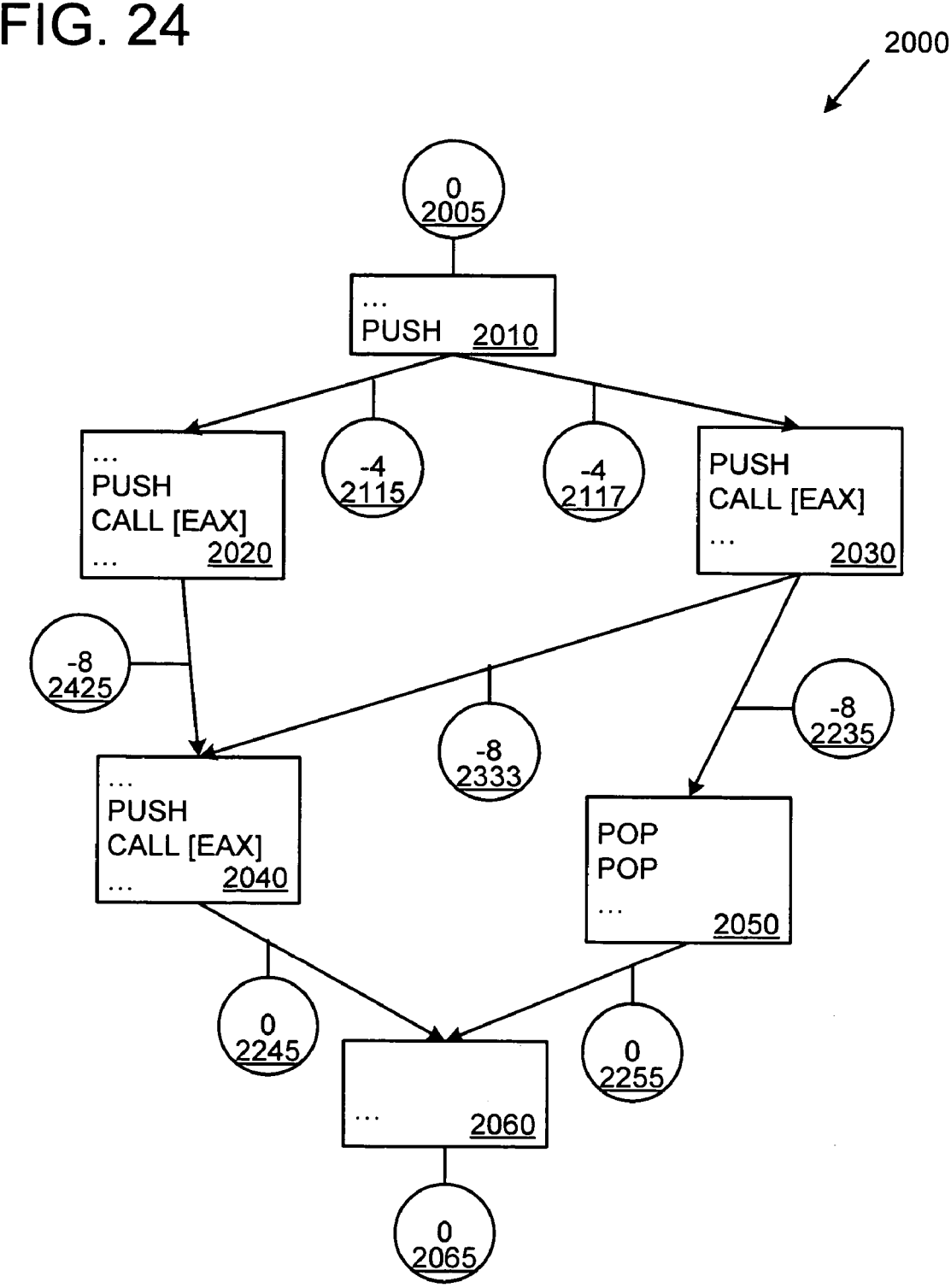

An alternate direction is again applied. An upward traversal of the control flow is shown in FIG. 24. Because the relative stack height at control flow joins must be the same, it is known that the relative stack height at indicator 2425 is −8.

At this point, the relative stack height at the entry and exit to the basic blocks 2020, 2030, and 2040 (e.g., all the basic blocks having calls for which the stack-height-altering behavior could not be determined). Via interpolation, the stack-height-altering behavior for the calls in those blocks can now be determined. Accordingly, stack locations can be assigned, and parameter passing clarified. The instructions can be raised to a higher level for static analysis if desired.

EXAMPLE 32

Exemplary Technique: Inserting Control Flow

In some cases, it may be helpful to insert control flow (e.g., into the source code) so that the analysis can take advantage of basic blocks that contain at most one call to a function (e.g., especially for indirect calls). For example, control flow that is known to always go in one direction can be inserted. Even though the logic of the program is unchanged, having fewer functions in a basic block may aid the analysis of any of the techniques described herein.

EXAMPLE 33

Exemplary Indication of Relative Stack Locations

Figure 25A:
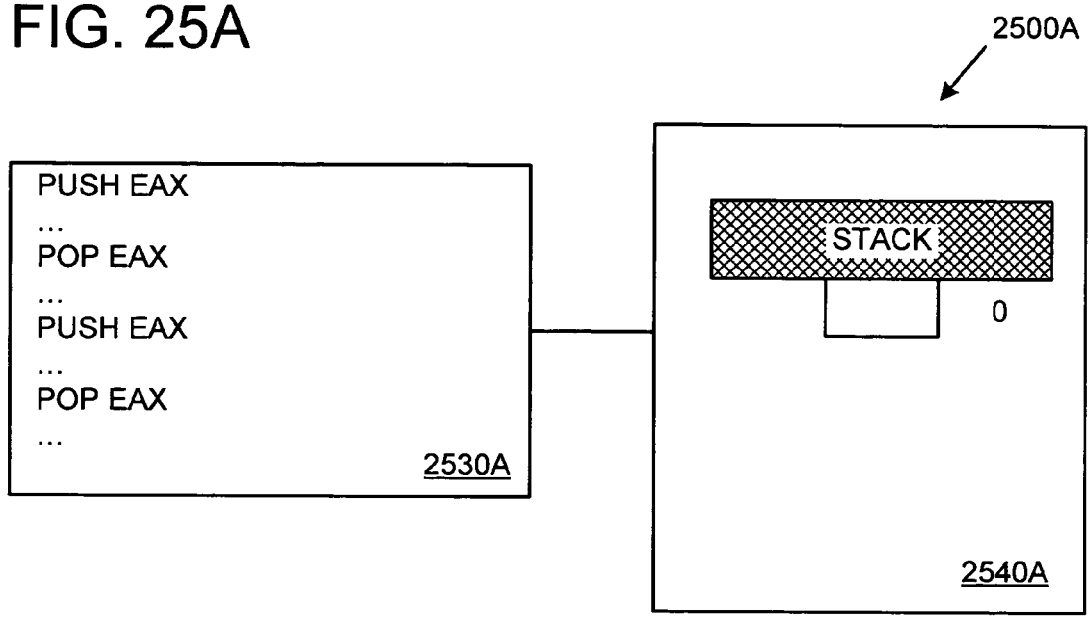
FIG. 25A is a block diagram showing exemplary low level program instructions and an accompanying stack.

FIG. 25A is a block diagram showing a scenario 2500A involving exemplary low level program instructions 2530A and an accompanying stack 2540A. In the example, the push and pop instructions refer to a single relative stack location, which can be referred to as the top of the stack at the time the instructions 2530 are entered. Such a location can also simply be called "0". Thus, an indication of the relative stack locations for the operand eax can simply be denoted as "0".

Figure 25B:
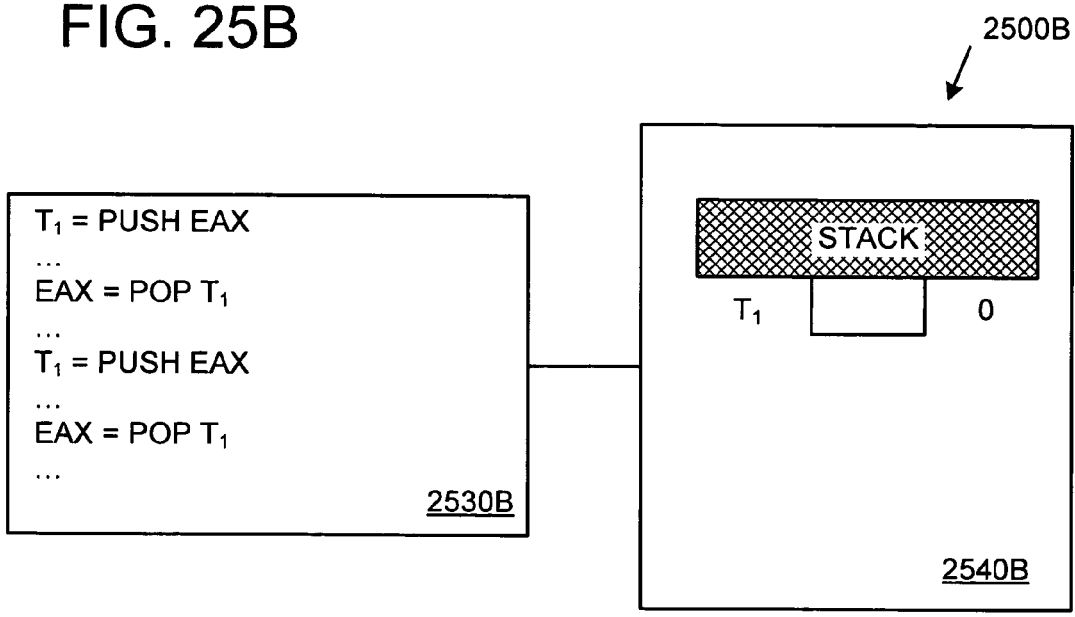
FIG. 25B shows the low level program instructions of FIG. 25A converted to a higher level by using an indicator of a stack location.

A more elaborate indication is shown in the arrangement 2500B of FIG. 25B. In the example, the same instructions have now been notated 2530B with a label to indicate locations within the stack 2540B. In the example, $t_1$ is used in place of 0. Such a label may be useful for illustration or analysis purposes. In some cases, a second label (e.g., $t_2$) may be used for the second use of the same location, a third label used for a third use, and so forth.

Figure 26A:
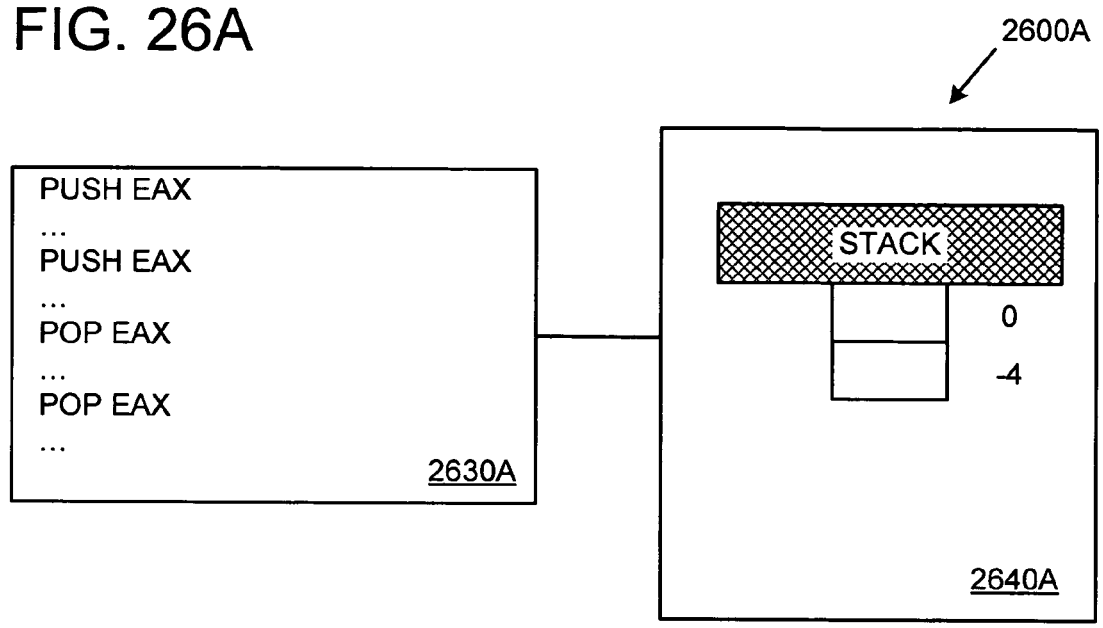
FIG. 26A is a block diagram showing exemplary low level program instructions and an accompanying stack.

FIG. 26 shows another scenario 2600A involving instructions 2630A that include references to two locations on the stack 2640A. The locations can simply be indicated via "0" and "−4".

Figure 26B:
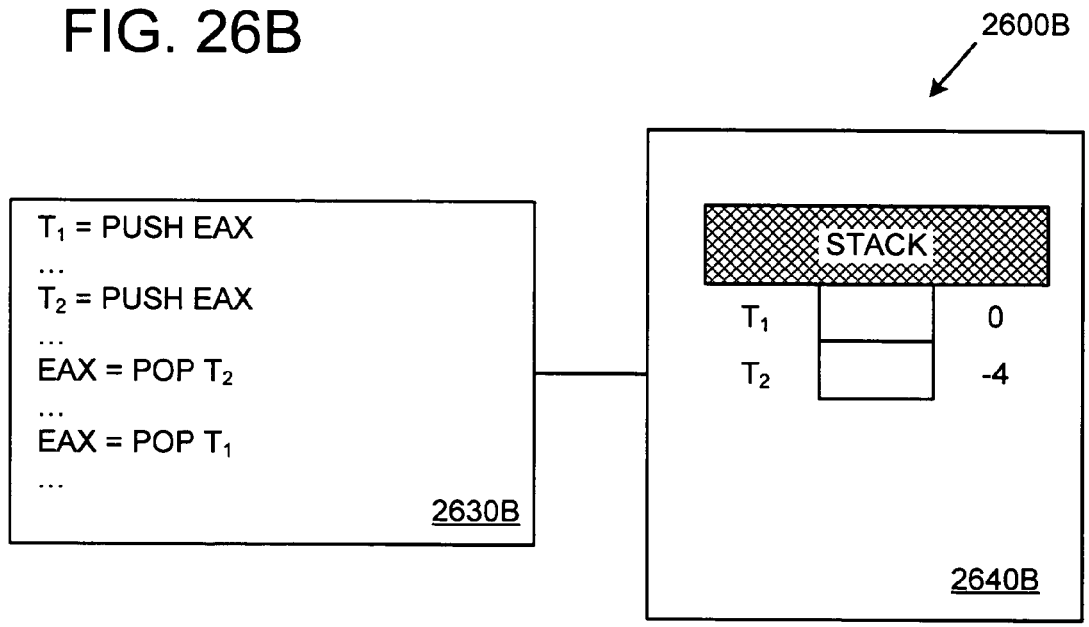
FIG. 26B shows the low level program instructions of FIG. 26A converted to a higher level by using an indicator of a stack location.

A more elaborate indication is shown in the arrangement 2600B of FIG. 26B. In the example, the locations are indicated via labels $t_1$ for location 0 and $t_2$ for location −4. Thus locations in the stack 2640B can be indicated via the labels in the representation 2630B.

EXAMPLE 34

Exemplary Application of Techniques to Raise Software Instructions

Figure 27A:
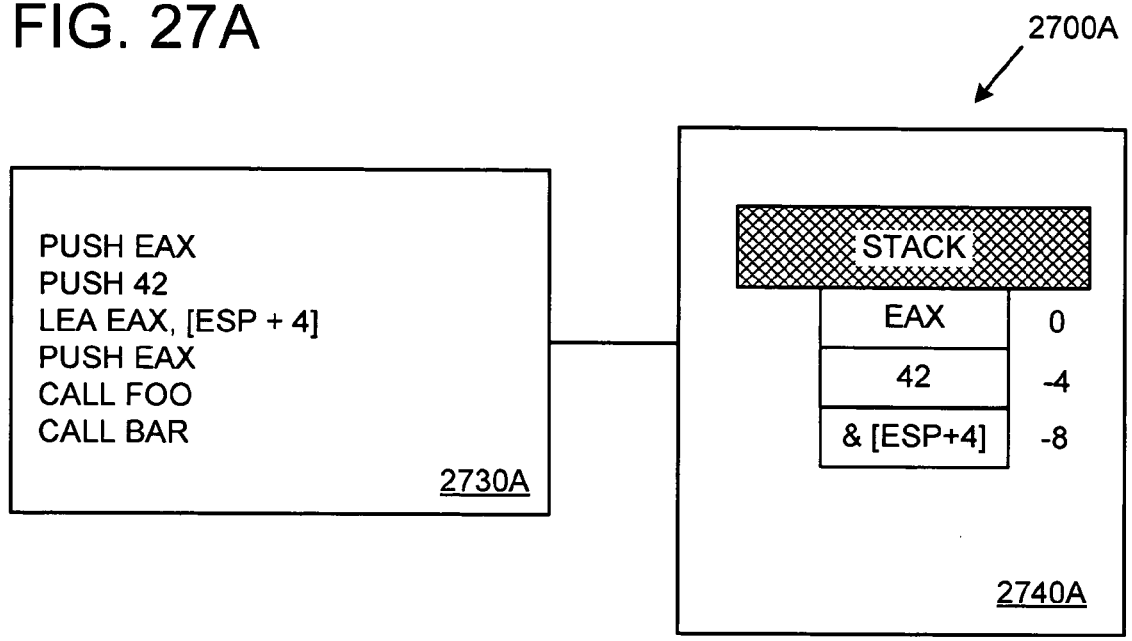
FIG. 27A is a block diagram showing exemplary low level program instructions and an accompanying stack, wherein the low level program instructions comprise ambiguous references to the stack (e.g., calls to functions).

FIG. 27A shows a scenario 2700A involving exemplary low level program instructions 2730A and an accompanying stack 2740A, wherein the low level program instructions comprise ambiguous references to the stack (e.g., calls to functions).

Although it can be determined that the example, the stack will appear as shown in 2740A at the time the call foo, instruction is executed, it is not known whether or how foo uses the items on the stack.

Figure 27B:
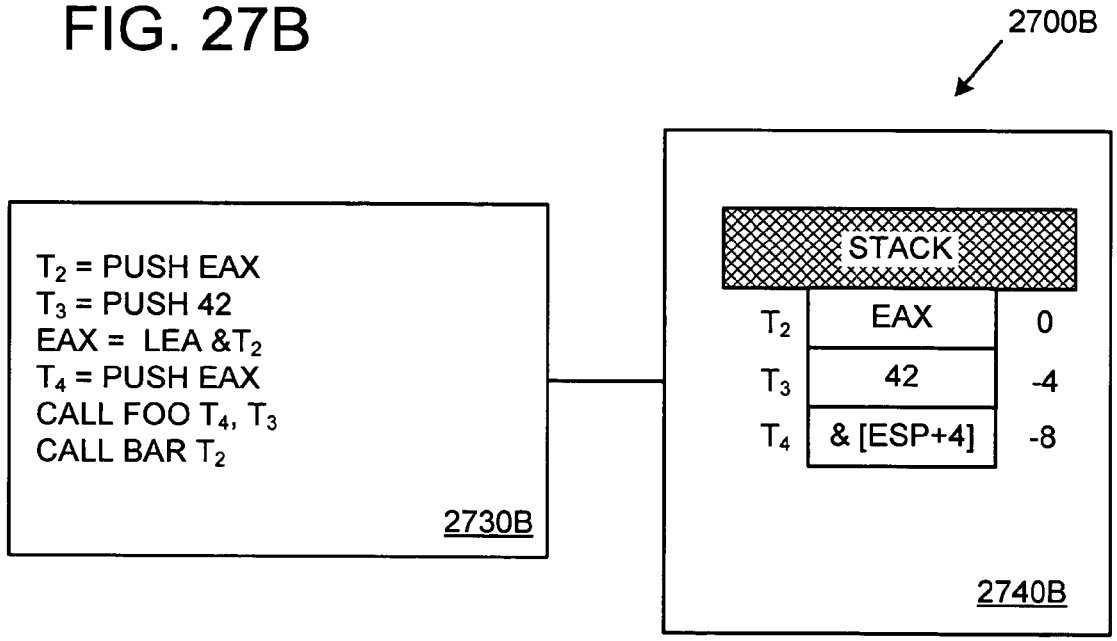
FIG. 27B shows the low level program instructions of FIG. 27A converted to a higher level after having determined the stack-altering-behavior of the calls to functions.

FIG. 27B shown an arrangement 2700B in which the instructions 2730A have been raised as shown in 2730B. Via any of the techniques described herein, the stack-height-altering behavior of foo and bar has been determined. Relative locations on the stack have been indicated as 0, −4, and −8. Such indications are sufficient for raising the program instructions and could be used to indicate which parameters are passed via the calls to foo and bar.

In the example, however, labels t1, t3, and t4 have been used. These labels correspond to the stack locations as shown in the stack 2740B.

Figure 28:
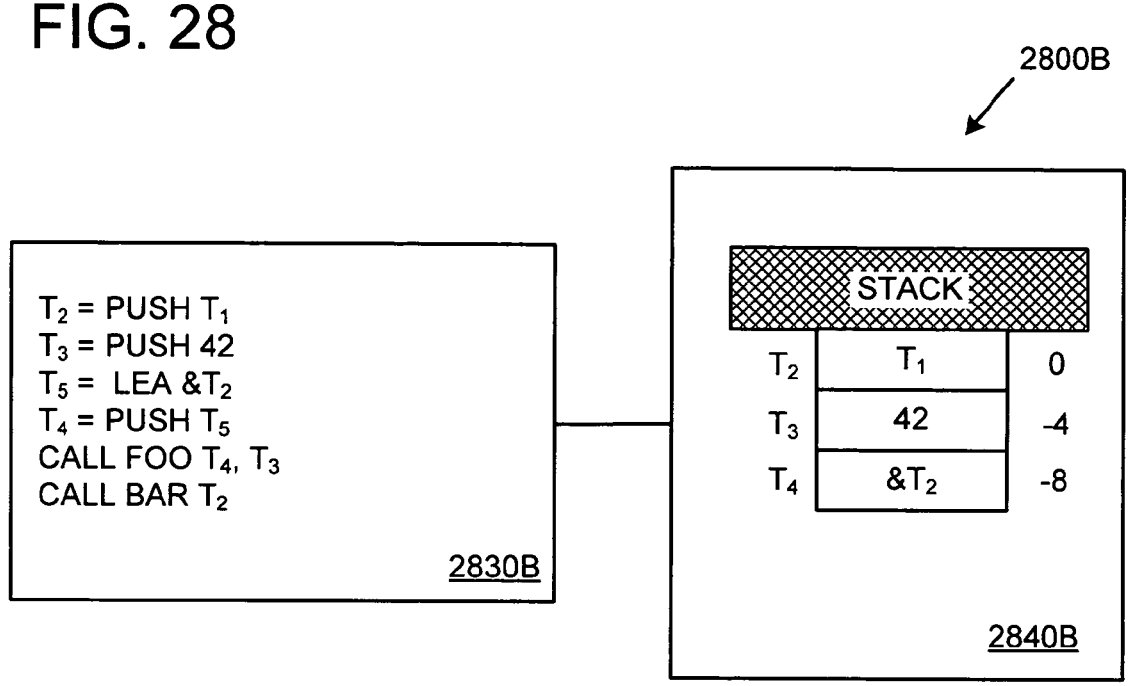
FIG. 28 shows the low level program instructions of FIG. 27A converted to a higher level in which references to registers have been removed.

FIG. 28 shows a scenario 2800 involving a further transformation of the instructions as shown in 2830. In the example, references to registers have been transformed into labels. Thus, no references to registers remain. Such a representation can be useful in certain circumstances, such as when a register-independent (e.g., machine-independent) representation is desired.

EXAMPLE 35

Exemplary Exception Handling

Although not shown, seeds for use in interpolation and control flow heuristics can also be determined by identifying exception handling code and extracting information therefrom (e.g. a return instruction that pops items off the stack).

EXAMPLE 36

Exemplary Heuristic: Stack Allocation

In any of the examples herein, an instruction allocating a variable amount of space on the stack (e.g., alloca) may be encountered. When such an instruction is encountered, it can be assumed that a constant number is allocated purposes of raising the instruction and resolving ambiguities. For example, it can be assumed that 100 bytes or some other number is allocated. Such an approach allows for an unambiguous reference that approximates actual execution and is useful for static analysis.

EXAMPLE 37

Exemplary Low-Level Intermediate Representation

In any of the examples described herein, raising can result in a low-level internal representation of the native software instructions. For example, instructions can be represented as an opcode and zero or more operands. The operands can represent variables in a dataflow-relevant way (e.g., as relative stack locations).

EXAMPLE 38

Exemplary Static Analysis Techniques

Static analysis techniques that can be used in conjunction with any of the examples described herein include data flow analysis, lifetime analysis, liveness analysis, assertion checking, and the like.

EXAMPLE 39

Exemplary Functions

In any of the examples described herein, although the term "function" is used, the same techniques can equally be applied to functions, procedures, or both.

EXAMPLE 40

Exemplary Programs

A program can include any set of instructions, whether executable or representative of executable instructions.

EXAMPLE 41

Exemplary Computing Environment

Figure 29:
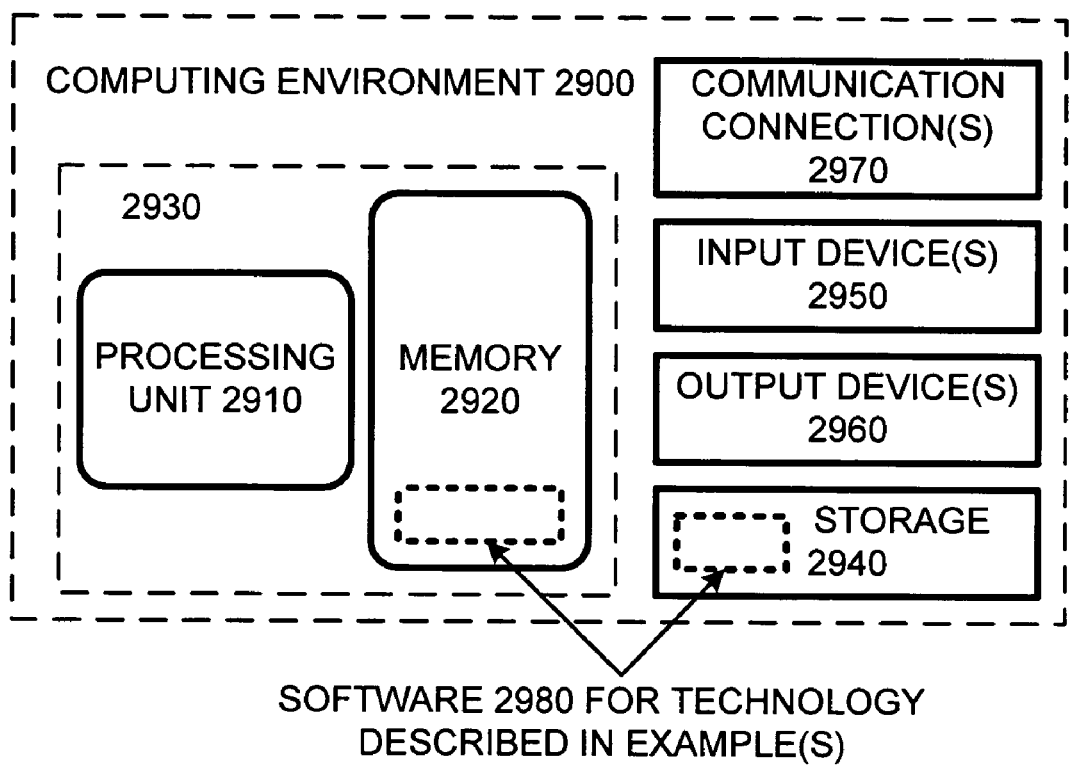
FIG. 29 is a block diagram of an exemplary suitable computing environment for implementing described implementations.

FIG. 29 illustrates a generalized example of a suitable computing environment 2900 in which the described techniques can be implemented. The computing environment 2900 is not intended to suggest any limitation as to scope of use or functionality, as the technologies may be implemented in diverse general-purpose or special-purpose computing environments.

With reference to FIG. 29, the computing environment 2900 includes at least one processing unit 2910 and memory 2920. In FIG. 29, this most basic configuration 2930 is included within a dashed line. The processing unit 2910 executes computer-executable instructions and may be a real or a virtual processor. In a multi-processing system, multiple processing units execute computer-executable instructions to increase processing power. The memory 2920 may be volatile memory (e.g., registers, cache, RAM), non-volatile memory (e.g., ROM, EEPROM, flash memory, etc.), or some combination of the two. The memory 2920 can store software 2980 implementing any of the technologies described herein.

A computing environment may have additional features. For example, the computing environment 2900 includes storage 2940, one or more input devices 2950, one or more output devices 2960, and one or more communication connections 2970. An interconnection mechanism (not shown) such as a bus, controller, or network interconnects the components of the computing environment 2900. Typically, operating system software (not shown) provides an operating environment for other software executing in the computing environment 2900, and coordinates activities of the components of the computing environment 2900.

The storage 2940 may be removable or non-removable, and includes magnetic disks, magnetic tapes or cassettes, CD-ROMs, CD-RWs, DVDs, or any other computer-readable storage media which can be used to store information and which can be accessed within the computing environment 2900. The storage 2940 can store software 2980 containing instructions for any of the technologies described herein.

The input device(s) 2950 (e.g., for devices operating as a control point in the device connectivity architecture 100) may be a touch input device such as a keyboard, mouse, pen, or trackball, a voice input device, a scanning device, or another device that provides input to the computing environment 2900. For audio, the input device(s) 2950 may be a sound card or similar device that accepts audio input in analog or digital form, or a CD-ROM reader that provides audio samples to the computing environment. The output device(s) 2960 may be a display, printer, speaker, CD-writer, or another device that provides output from the computing environment 2900.

The communication connection(s) 2970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Methods in Computer-Executable Media

Any of the methods described herein can be implemented by computer-executable instructions in one or more computer-readable media.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. One or more computer-readable storage media having computer-executable instructions for performing a method comprising:

receiving a representation of one or more low level program instructions, wherein the low level program instructions comprise one or more ambiguous references to a stack, wherein the one or more ambiguous references to the stack are ambiguous due to unknown stack-height-altering behavior of a call to a function with an unknown number of parameters passed to the function via the stack; and determining at least one unambiguous reference to the stack for the one or more ambiguous references to the stack, wherein the determining comprises determining at least one unambiguous stack location for the ambiguous references to the stack with one or more heuristics determining stack-height-altering behavior of the call to the function.

2. The one or more computer-readable media of claim 1 wherein the method further comprises:

outputting a higher level representation of the low level program instructions, wherein the higher level representation comprises the at least one unambiguous reference to the stack.

3. The one or more computer-readable media of claim 1 wherein:

the low level program instructions comprise at least one instruction allocating a variable size of memory on the stack; and determining the at least one unambiguous reference to the stack comprises assuming a constant size is allocated by the at least one instruction allocating the variable size of memory on the stack.

4. The one or more computer-readable media of claim 1 wherein:

the low level program instructions comprise one or more calls to one or more functions; and determining the at least one unambiguous reference to the stack comprises determining how many parameters are passed in at least one of the one or more calls to one or more functions in the low level program instructions.

5. The one or more computer-readable media of claim 1 wherein determining the at least one unambiguous reference to the stack comprises:

determining stack-height-altering behavior of one or more calls in the low level program instructions to one or more target functions.

6. The one or more computer-readable media of claim 5 wherein:

the low level program instructions are contained within a function; and determining the stack-height-altering behavior of one or more calls in the low level program instructions comprises:

determining the stack-height-altering behavior of at least one basic block of the function; and determining the stack-height-altering behavior of a call in the function to another target function via interpolation.

7. The one or more computer-readable media of claim 5 wherein:

determining the stack-height-altering behavior of one or more calls in the low level program instructions comprises applying a direct call heuristic.

8. The one or more computer-readable media of claim 7 wherein the direct call heuristic comprises:

locating a return instruction indicating how many parameters are popped off the stack, wherein the return instruction indicates how many parameters were passed by a calling function.

9. The one or more computer-readable media of claim 5 wherein:
determining the stack-height-altering behavior of one or more calls in the low level program instructions comprises applying an indirect call heuristic.

10. The one or more computer-readable media of claim 9 wherein:
the indirect call heuristic comprises a dataflow-to-target-function heuristic.

11. The one or more computer-readable media of claim 10 wherein the dataflow-to-target-function heuristic comprises:
determining contents of a register used in an indirect call in the low level program instructions; and
applying a direct call heuristic via the contents of the register.

12. The one or more computer-readable media of claim 9 wherein:
the indirect call heuristic comprises a dataflow-to-target-function-type heuristic.

13. The one or more computer-readable media of claim 12 wherein:
at least one of the calls is to a virtual function of an object; and
the dataflow-to-target-function-type heuristic comprises identifying a this pointer for the object.

14. The one or more computer-readable media of claim 12 wherein:
at least one of the calls is to a virtual function of an object; and
the dataflow-to-target-function-type heuristic comprises identifying a constructor for the object.

15. The one or more computer-readable media of claim 9 wherein:
the indirect call heuristic comprises an import name heuristic.

16. The one or more computer-readable media of claim 15 wherein the import name heuristic comprises:
determining the stack-height-altering behavior of at least one function of the one or more calls in the low level program instructions as indicated by information contained in an import name of the at least one function.

17. The one or more computer-readable media of claim 9 wherein:
the indirect call heuristic comprises a cleanup instructions heuristic.

18. A method of raising a plurality of low level program instructions during static analysis of the plurality of low level program instructions, the method comprising:
receiving a representation of the plurality of low level program instructions, wherein the low level program instructions comprise an ambiguous reference to a stack, wherein the ambiguous reference to the stack comprises an indirect call to a function, wherein the indirect call passes one or more parameters;
using a set of a plurality of heuristics comprising a control flow heuristic to determine how many parameters are passed by the indirect call;
determining a relative location on the stack of at least one of the parameters if the instructions were to be executed in light of the how many parameters are passed by the indirect call;
mapping the ambiguous reference to the stack of the indirect call to the relative location on the stack; and
annotating a higher level representation of the low level program instructions with an indication of the relative location on the stack.

19. The method of claim 1 wherein determining the at least one unambiguous reference to the stack comprises:
applying a control flow heuristic.

20. One or more computer-readable storage media having computer-executable instructions for performing a method comprising:
receiving a representation of one or more low level program instructions, wherein the low level program instructions comprise one or more ambiguous references to a stack, wherein the one or more ambiguous references to the stack are ambiguous due to unknown stack-height-altering behavior of a call to a first function with an unknown number of parameters passed to the first function via the stack, and wherein at least one of the ambiguous references to the stack comprises a call to a second function with at least one parameter having an ambiguous stack location; and
determining at least one unambiguous reference to the stack for the one or more ambiguous references to the stack, wherein the determining comprises determining a stack location of the at least one parameter having the ambiguous stack location via application of one or more heuristics selected from the group consisting of a direct call heuristic that locates a return instruction indicating how many parameters are popped off the stack, an indirect call heuristic that comprises a dataflow-to-target heuristic, an indirect call heuristic that comprises a dataflow-to-target-function-type heuristic, an indirect call heuristic that comprises an import name heuristic, an indirect call heuristic that comprises a cleanup instruction heuristic, and a control flow heuristic;
wherein the one or more heuristics are configured to determine stack-height-altering behavior of the call to the first function.

* * * * *